(12) United States Patent
Fratello et al.

(10) Patent No.: US 6,863,739 B2
(45) Date of Patent: Mar. 8, 2005

(54) VEHICLE WASH APPARATUS WITH AN ADJUSTABLE BOOM

(75) Inventors: Daniel A. Fratello, Golden, CO (US); David M. Gauthier, Denver, CO (US)

(73) Assignee: Mark VII Equipment LLC, Arvada, CO (US)

( * ) Notice: Subject to any disclaimer, the term of this patent is extended or adjusted under 35 U.S.C. 154(b) by 270 days.

(21) Appl. No.: 10/086,001

(22) Filed: Feb. 26, 2002

(65) Prior Publication Data

US 2002/0162576 A1 Nov. 7, 2002

Related U.S. Application Data

(63) Continuation-in-part of application No. 09/849,763, filed on May 4, 2001.

(51) Int. Cl.$^7$ ................................................. B08B 3/02
(52) U.S. Cl. .............................. 134/18; 134/26; 134/34; 134/56 R; 134/113; 134/123; 134/181
(58) Field of Search ........................ 134/45, 94.1, 95.1, 134/56 R, 57 R, 113, 181, 123, 18, 26, 34; 15/DIG. 2

(56) References Cited

U.S. PATENT DOCUMENTS

| | | | |
|---|---|---|---|
| 2,583,703 A | 1/1952 | Morison ........................ 15/97 |
| 2,689,577 A | 9/1954 | Dunn et al. .................. 134/123 |
| 2,936,770 A | 5/1960 | Emanuel ..................... 134/123 |
| 2,987,067 A | * 6/1961 | Vani et al. ................... 134/99.2 |
| 3,102,545 A | 9/1963 | Knight, Jr. et al. ........... 134/45 |
| 3,258,019 A | 6/1966 | Bellas et al. .................. 134/99 |
| 3,259,138 A | 7/1966 | Heinicke ..................... 134/45 |
| 3,289,449 A | 12/1966 | O'Brien ....................... 72/201 |
| 3,324,868 A | 6/1967 | Kaufman ..................... 134/123 |
| 3,351,076 A | 11/1967 | Haines ......................... 134/58 |
| 3,410,284 A | 11/1968 | Burger ......................... 134/57 |
| 3,445,286 A | 5/1969 | Smith, Jr. et al. ............. 134/32 |
| 3,460,548 A | 8/1969 | Giovagnoli ................... 134/58 |
| 3,496,908 A | 2/1970 | Bernardi ........................ 118/2 |
| 3,529,611 A | 9/1970 | Daum et al. ................. 134/112 |
| 3,533,422 A | * 10/1970 | Alimanestiano ............. 134/45 |
| 3,545,460 A | 12/1970 | Daum et al. ................. 134/123 |
| 3,559,659 A | * 2/1971 | Gougoulas ................... 134/45 |
| 3,570,502 A | 3/1971 | Fransworth et al. .......... 134/45 |
| 3,575,184 A | 4/1971 | Jurkens ........................ 134/45 |
| 3,581,335 A | 6/1971 | Saxonmeyer .................. 15/53 |
| 3,593,730 A | 7/1971 | Burchett ..................... 134/123 |
| 3,595,250 A | * 7/1971 | Hurst ........................... 134/45 |
| 3,604,434 A | * 9/1971 | Hurst ........................ 134/58 R |
| 3,612,075 A | 10/1971 | Cook ........................... 134/99 |

(List continued on next page.)

FOREIGN PATENT DOCUMENTS

| | | |
|---|---|---|
| FR | 2653399 | 4/1991 |
| GB | 686716 | 1/1953 |
| JP | 5-105040 | 4/1993 |
| JP | 5-147506 | 6/1993 |
| JP | 5-330406 | 12/1993 |
| KR | 2001094301 | * 10/2001 |

*Primary Examiner*—Frankie L. Stinson
(74) *Attorney, Agent, or Firm*—Dorsey & Whitney LLP

(57) ABSTRACT

An automatic vehicle washing system is described. The vehicle washing system incorporates an elongated overhead cleaning platform for cleaning the front, top and rear surfaces of a vehicle. The overhead cleaning platform is attached to a single lift mechanism at a first end and is suspended from a belt at a second end, wherein the belt is also operatively connected to the first end. Accordingly, vertical movement of the lift actuator causes both ends of the platform to uniformly rise or descend. The platform further comprises a pivotal boom with fluid nozzles attached thereto, and a reciprocating pivotal actuator. The reciprocating pivotal actuator is capable of pivotal movement to any number of angular orientations within its operative range of motion. Advantageously, the pivotal and vertical positions of the nozzles can be independently varied, permitting the location of the overhead cleaning nozzles to be optimized for various vehicle profiles.

10 Claims, 27 Drawing Sheets

U.S. PATENT DOCUMENTS

| | | | |
|---|---|---|---|
| 3,650,281 A | * 3/1972 | Hurst | 134/58 R |
| 3,688,784 A | 9/1972 | Daum et al. | 134/123 |
| 3,726,293 A | 4/1973 | Padek | 134/45 |
| 3,786,823 A | 1/1974 | Wiley | 134/45 |
| 3,844,480 A | 10/1974 | Taylor et al. | 239/186 |
| 3,878,812 A | 4/1975 | Takeuchi | 118/2 |
| 4,231,239 A | 11/1980 | Lazaroff | 68/205 R |
| 4,562,848 A | 1/1986 | Messing et al. | 134/123 |
| 4,643,209 A | * 2/1987 | Fast | 134/123 |
| 4,719,932 A | * 1/1988 | Burton | 134/57 R |
| 4,750,504 A | 6/1988 | Flaxman | 134/123 |
| 4,788,993 A | 12/1988 | Beer et al. | 134/123 |
| 4,852,593 A | * 8/1989 | Daugherty | 134/95.3 |
| 4,857,113 A | 8/1989 | Hodge | 134/32 |
| 4,895,307 A | 1/1990 | Swinehart et al. | 239/263 |
| 4,946,513 A | 8/1990 | Del Prato et al. | 134/18 |
| 4,971,084 A | * 11/1990 | Smith et al. | 134/45 |
| 5,255,695 A | * 10/1993 | Downey | 134/123 |
| 5,725,003 A | * 3/1998 | Jaakkonen | 134/123 |
| 5,901,720 A | 5/1999 | Lange | 134/172 |
| 6,095,438 A | * 8/2000 | Fratello et al. | 239/432 |
| 6,277,207 B1 | * 8/2001 | Gauthier | 134/18 |
| 6,372,053 B1 | * 4/2002 | Belanger et al. | 134/34 |
| 6,394,370 B1 | 5/2002 | Payne et al. | 239/722 |
| 6,571,807 B2 | * 6/2003 | Jones | 134/56 R |

* cited by examiner

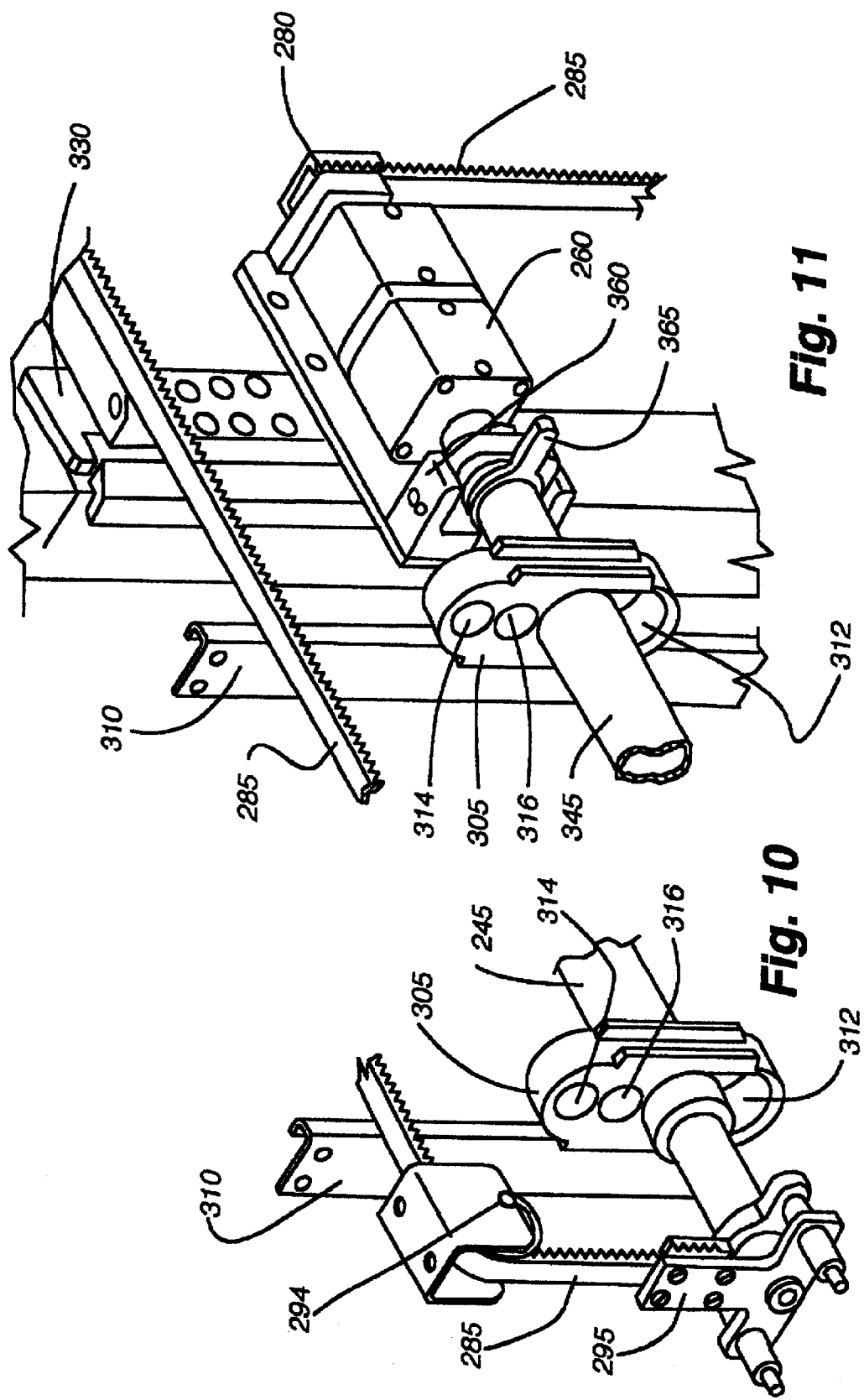

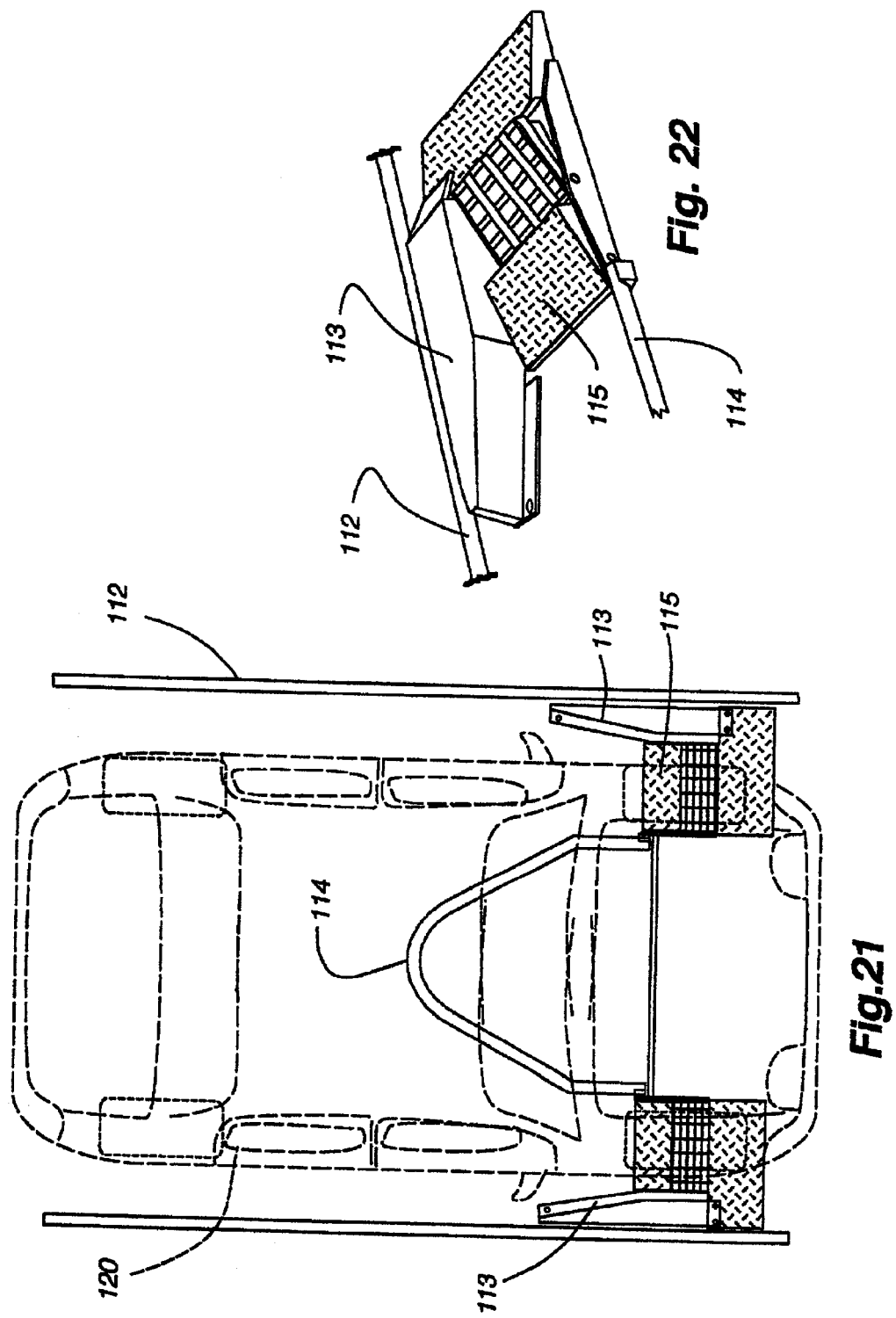

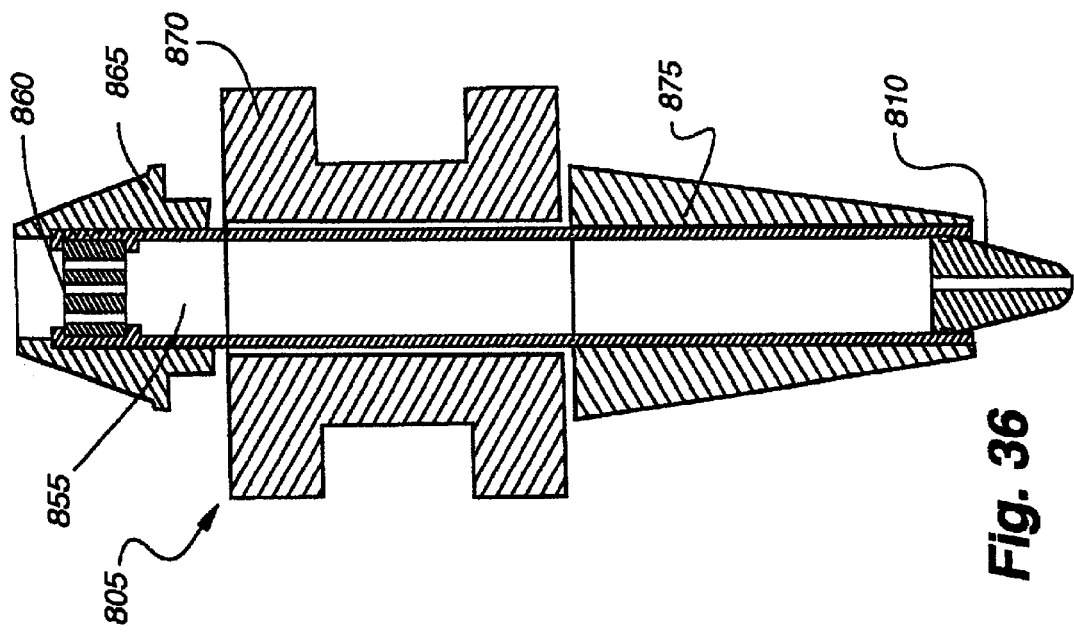
Fig. 36
Fig. 35
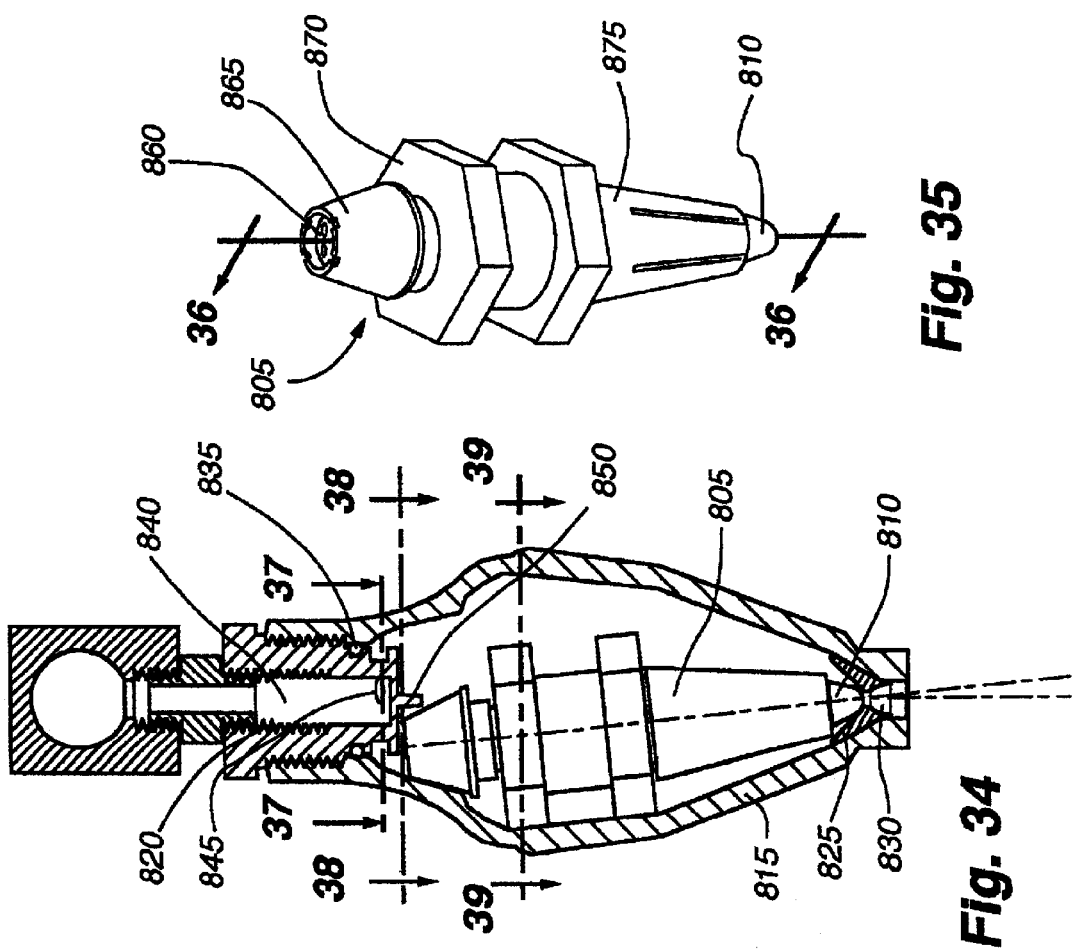
Fig. 34

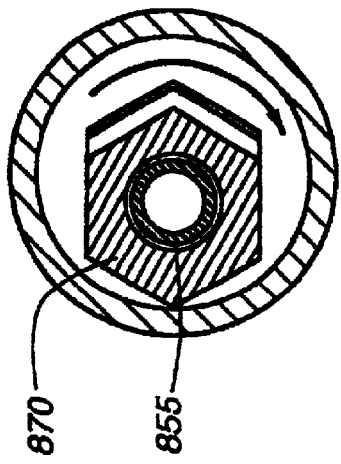
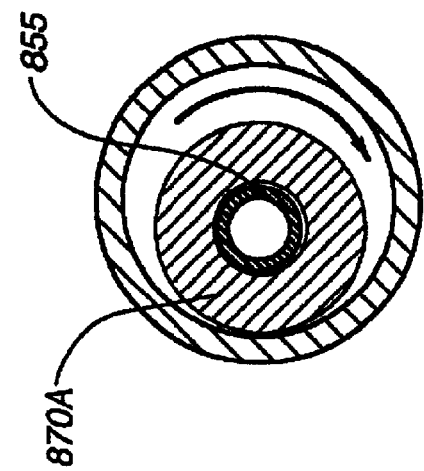
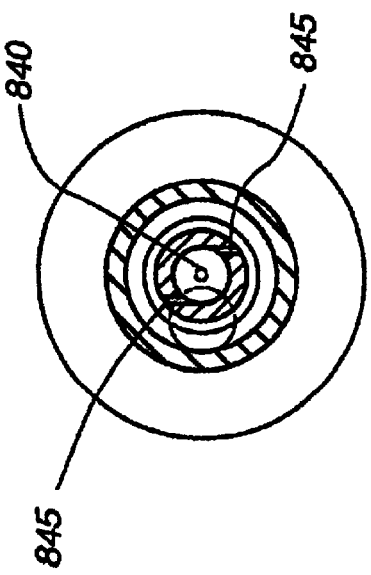
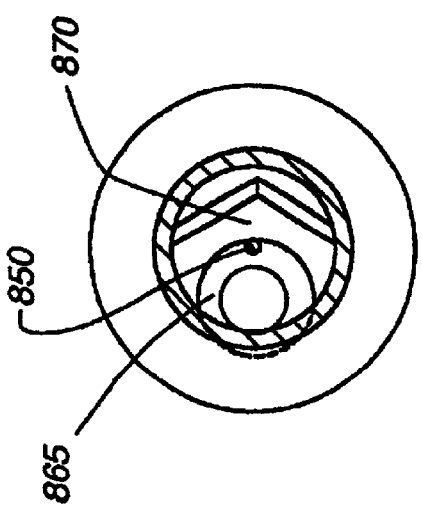

VEHICLE WASH APPARATUS WITH AN ADJUSTABLE BOOM

REFERENCE TO RELATED APPLICATIONS

This application is a continuation-in-part of application Ser. No. 09/849,763 that was filed on May 4, 2001.

FIELD OF THE INVENTION

The present invention relates generally to automatic vehicle washing systems and, more particularly, to an overhead cleaning platform capable of independent vertical and pivotal positioning of a plurality of nozzles attached thereto.

BACKGROUND OF THE INVENTION

"Brushless" automated vehicle washing systems are commonly utilized to quickly and efficiently clean vehicles without requiring any hand scrubbing or contact between cleaning members and the exterior of a vehicle. Brushless vehicle washing systems utilize jets of pressurized cleaning fluid sprayed from a plurality of nozzles to wash away dirt and grime from the exterior surfaces of a vehicle. In one common type of washing system, the nozzles are commonly arranged in a gantry. The gantry either 1) passes over and around the vehicle or 2) is stationary and the vehicle passes through it. In either instance, the nozzles direct jets of cleaning fluid over most if not the entire exterior surface of the vehicle.

The cleaning efficiency and effectiveness of a vehicle washing system is largely dependent upon two factors: the force at which the pressurized cleaning fluid impinges on the vehicle surface; and the effective area on the vehicle's surface impacted by the pressurized cleaning fluid. In order to effectively clean the entire surface of a vehicle, the cleaning fluid jet must impact the adjacent surface with a requisite amount of force in order to dislodge any dirt or foreign matter resident on the adjacent surface. The amount of force per unit area imparted on the adjacent surface is dependent on several factors including the speed and angle at which the jet of cleaning fluid impacts the adjacent surface. As the distance between the nozzle and the adjacent surface increases, the speed of the cleaning fluid decreases; also the jet begins to fan increasing the impact area on the adjacent surface, thereby spreading the impact force over a greater area, and reducing cleaning effectiveness. Accordingly, those parts of a vehicle that are furthest from the nozzles may not be adequately cleaned.

Typically, gantry-type cleaning systems have the most difficulty cleaning the front and rear of a vehicle, since the nozzles located at the sides and top of the gantry normally direct jets of cleaning fluid parallel or at a very shallow angle to the vehicle's front and rear surfaces. Gantry-type washing systems have been developed wherein overhead nozzles are mounted on moveable platforms that (1) pivot to increase the angle of incidence between the fluid jet and the front and rear surfaces of the vehicle, (2) move vertically to decrease the distance between the nozzles and front and rear surfaces, or (3) both pivot and move vertically. The last type of moveable platform is preferred, wherein the platform maybe lowered to get close to front or rear surfaces and pivoted so that the fluid jets impact the surface at a desired angle.

Despite what type of vehicle washing system is utilized, vehicle owners often desire the option of applying additional specialty solutions to their vehicle, such as spot free rinse solutions and clear solutions. Both of these solutions are relatively expensive when compared to the other liquids used during the wash cycle such as water. Accordingly, it is desirable to minimize waste of the specialty solutions, while maximizing coverage of the vehicle's surface. Current art gantry-systems apply these solutions in a number of ways. Using one method, specialty solutions may be applied through the same high-pressure nozzles that are utilized to apply the cleaning and rinsing solutions. This is undesirable for at least two reasons: one, the specialty solution left in the supply lines must be purged prior to the beginning of the next vehicle wash; and two, the use of a high pressure delivery device might deliver a greater than necessary volume of specialty solution to the vehicle as the gantry traverses the vehicle's length. The result is an inefficient use of the expensive specialty solutions. It is noted that high-pressure delivery of specialty fluid is rarely necessary since specialty solutions are chemical cleaners, not dynamic cleaners; accordingly, the primary goal when applying a specialty solution is simply to obtain complete vehicle coverage.

Another method utilized to apply specialty solutions has been to spray the specialty fluid, often in the form of a foam, onto the sides of the vehicle from discharge openings spaced along vertical dispensing tubes attached to the gantry's side legs. The problem of inefficiency is minimized, since there is no need to purge the dedicated specialty fluid delivery system after each vehicle wash. Unfortunately, these vertically mounted delivery systems have difficulty in delivering solution in a manner that completely covers the top surfaces of a vehicle as there is often little impetus for the applied specialty solution to flow along the horizontal top surfaces of the vehicle, especially when the solution is in the form of a foam.

SUMMARY OF THE INVENTION

An automatic vehicle washing system is described. In one embodiment, a vertically moveable platform is suspended from a left end while being supported from below on the right end. One or more nozzles are coupled with the platform for spraying jets of cleaning fluid onto the surface of a vehicle. Preferably, the left end of the platform is suspended by a belt, cable or chain wherein the belt, cable or chain is slideably coupled to the frame and ultimately connected to the right end of the platform for uniform vertical movement therewith. The right end of the platform is supported by a lift actuator. Accordingly, when the lift actuator is actuated to lift the right end of the platform, the belt, cable or chain slides through the frame coupling and is pulled upwards at its junction with the left end, causing the left end to rise in unison with the right end.

In a preferred embodiment, the lift actuator is pneumatic and in communication with a compressor to provide the pressurized air necessary to lift and lower the platform. A pressurized air tank may be provided to serve as a backup in case of a power failure or car wash system malfunction. The air tank may be coupled to a pneumatic switch which automatically opens and allows pressurized air into the lift actuator to raise the platform to its topmost position should power to the compressor be interrupted. In other embodiments, a mechanical lift actuator that uses a lead screw, a drive screw or a drive belt may be used in place of a pneumatic lift.

Typically, the platform comprises a pivoting boom attached to a reciprocating pivotal actuator. A plurality of cleaning nozzles are coupled with the boom and by pivoting the boom; the angle of the fluid jets emanating from the nozzles can be changed. In a first variation of the pivoting boom, mechanical stops are utilized to set the clockwise and counterclockwise pivoted positions of the boom, thereby varying the angle of the fluid jets off vertical. In a second variation of the pivoting boom, the actuator is utilized in conjunction with a guided follower arm. The follower arm permits a certain amount of pivotal movement of the boom depending on the vertical location of the platform. In a third variation of the pivoting boom, the actuator is capable of pivoting to a plurality of selected orientations and holding the boom at that orientation. As necessary, sensors are utilized to determine the desired pivotal orientation of the boom.

The nozzles may be coupled to the boom in any suitable fashion, although in one embodiment the nozzles are coupled to the boom by way of rotating wand assemblies wherein the nozzles are attached to the ends of one or more wands. In another embodiment, nozzle-tipped wands may reciprocate about a pivot point on the boom. The nozzles may also be directly attached to the boom. The nozzles may be 0-degree nozzles, turbo nozzles, slow rotating turbo nozzles, oscillating nozzles or any other type, or combination thereof. In the preferred embodiment, the boom nozzles are fluidly coupled with a dump valve that is typically located below the boom at a location approximately 3 feet from the base of the vehicle wash framework with a hose extending from the dump valve to the floor of the wash bay. In operation after a wash cycle has been performed, the dump valve is activated and a substantial portion of the cleaning solution remaining within the nozzles is siphoned out of the system therethrough.

In the preferred embodiment, one or more low pressure fluid conduits with low pressure nozzles attached thereto are attached to a bottom surface of the horizontal span of the gantry, wherein specialty fluids such as clear coats and spot free rinses may be sprayed on the top of the vehicle. Additionally, low-pressure fluid conduits may be provided on either leg of the gantry to spray the fluids onto the side of the vehicle. By providing a low-pressure conduit for each specialty fluid, the conduits need not be flushed to change fluids. Furthermore, by utilizing specialized individual conduits, specialty fluid efficiency is enhanced. The overhead and side locations of the conduits ensures accurate and adequate application of fluid to all surfaces of the vehicle. In one embodiment, clear coat (or drying agent) conduits are located proximate either the front or rear face of the gantry and spot free rinse (or reverse osmosis water) conduits are located proximate the other of the front or rear face of the gantry, wherein both specialty solutions can be applied in a single pass of the gantry over the vehicle.

In the preferred embodiment a series of turbo nozzles are located on the inside surfaces of the gantry legs. The nozzles are located at vertical positions generally corresponding to the locations of a rocker panel on a vehicle, the middle of a vehicle and the upper portion of a vehicle. Typically, the plurality of nozzles in each leg are supplied high pressure fluid from a common source and are capable of concurrent operation. One or more solenoids or switches may be provided wherein the nozzles corresponding to the upper or lower portions of the vehicle may be turned on or off independently of the other nozzles. The integration of the rocker panel nozzles and the side nozzles to the same fluid source permit both a side rinse and rocker panel blast to occur in the same pass.

The integration of the boom nozzles with the upper and lower side nozzles on the gantry legs or the preferred embodiment facilitates pressure profiling of the vehicle during the wash cycle. The pressure of cleaning solution supplied to the nozzles is greatest when only the boom nozzles are being utilized to clean the front and rear ends of the vehicle. The cleaning solution pressure is at a medium level when the boom nozzles are being utilized in conjunction with the lower side nozzles of the gantry legs to clean the hood or trunk and the sides of the vehicle proximate the hood or the trunk. The cleaning solution pressure is at its lowest when the boom nozzles and the upper and lower side nozzles of the gantry legs are all utilized simultaneously to clean the cab of the vehicle.

In the preferred embodiment of the invention, a moving gantry is utilized that moves over and alongside a stationary vehicle on a set of rails. A gear motor is utilized that can move the gantry at a plurality of speeds along the rails. The motor is interfaced with a microprocessor controller. Through the controller, which measures the gantry's movement along associated rails through a pulsar wheel and sensor, the gantry's rate of travel over the vehicle can be varied not only from pass to pass but responsive to various zones identified on the vehicle that is being washed. When the boom is deployed in front of or behind the vehicle, the controller is further configured to override the set speed for the associated zone as necessary to ensure that the boom does not come into contact with the vehicle.

Other aspects, features and details of the present invention can be more completely understood by reference to the following detailed description of the preferred and selected alternative embodiments, taken in conjunction with the drawings, and from the appended claims.

BRIEF DESCRIPTION OF THE DRAWINGS

FIG. 10 is a fragmentary isometric illustrating the left end of the pivoting boom assembly.

FIG. 11 is a fragmentary isometric illustrating the right end of the pivoting boom assembly.

FIG. 21 is top view of the bay of a vehicle wash system illustrating the wheel stops and vehicle guide members.

FIG. 22 is an enlarged isometric view of the wheel stop and the guide platform of the outside vehicle guide member.

FIG. 34 is vertical section of a turbo nozzle.

FIG. 35 is an isometric view of a rotating nozzle member of a turbo nozzle.

FIG. 36 is a section of the rotating nozzle member taken along line 36—36 of FIG. 35.

FIG. 37 is a section of the turbo nozzle taken along line 37—37 of FIG. 34.

FIG. 38 is a section of the rotating turbo nozzle taken along line 38—38 of FIG. 34.

FIG. 39 is a section of the turbo nozzle taken along line 39—39 of FIG. 34.

FIG. 40 is a section similar to FIG. 39 illustrating a variation of the rotating nozzle member at line 39—39.

DETAILED DESCRIPTION

A gantry-type vehicle washing system in accordance with the present invention incorporates a single pneumatic cylinder to lift and lower both sides of an overhead cleaning platform in cooperation with a drive belt, eliminating the need to coordinate movement between two lifting mechanisms located on either ends of the platform. The platform includes a reciprocating pivotal actuator that is coupled with a boom such that the boom can be pivoted. A plurality of fluid delivery nozzles are coupled to the boom. Advantageously, the pivotal movement of the boom is operationally independent from the vertical movement, thus permitting greater adaptability of the washing system to vehicles of differing profiles. Furthermore, one or more low-pressure conduits are disposed lengthwise across the top span of the gantry and vertically along the legs of the gantry with nozzles spaced thereon to deliver specialty fluids to the top and sides of the vehicle. Nozzles located near the end of the manifolds may be angled inwardly slightly as to insure the specialty fluids impact the vehicle. One set of conduits for a first type of fluid, such as a clear coat, may be located near one face of the gantry and another set of conduits for a second type of fluid, such as a spot free rinse, may be located near the other face of the gantry. Advantageously, during a single pass of the gantry over the vehicle, the first type of fluid may be applied to the vehicle as the one face passes overhead, and the second type of fluid applied to the vehicle as the other face passes overhead shortly thereafter. Finally, a switch or solenoid is provided, wherein the fluid supply to the upper high pressure nozzles on each gantry leg can be shut off without interrupting the fluid supply to the lower high pressure nozzles. Additionally, another switch or solenoid is provided wherein both the upper and lower nozzles on a gantry leg can be turned off during a wash cycle while the high pressure nozzles associated with the moveable platform can continue to operate. Accordingly, depending on the profile of the vehicle being washed, the upper nozzles can be turned off when their fluid jets would not impact the side of the vehicle and both the upper and lower nozzles can be turned off when the gantry is in front of or behind the vehicle such as when the front or rear surfaces of the vehicle are being washed.

A First Embodiment

A first embodiment of a gantry type vehicle washing system 100 in accordance with the present invention is illustrated in FIGS. 1–14 and 21–26.

Figure 1:
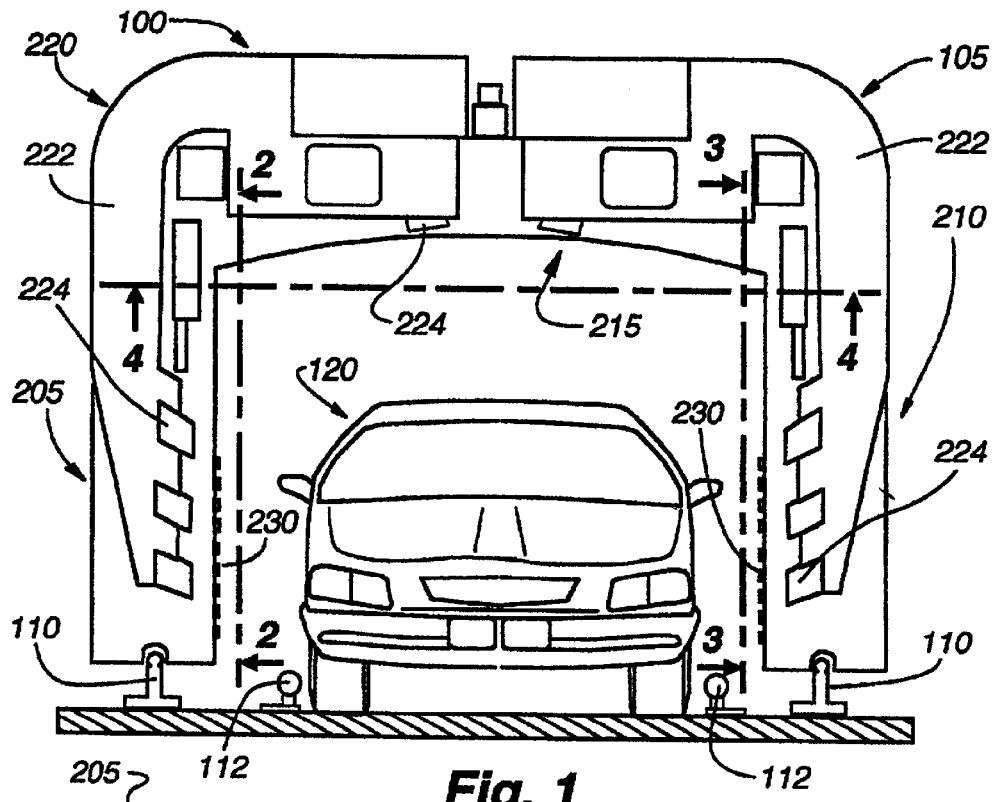
FIG. 1 is a front elevation of a gantry-type washing system with an automobile positioned in-between the gantry.

Referring to FIG. 1, the gantry type vehicle washing system 100 comprises a gantry structure 105, gantry guide rails 110, and vehicle guide members 112. Generally, the gantry structure 105 includes the plumbing and mechanicals necessary to effectively clean a vehicle 120, such as an automobile, truck, van or SUV, as will be described in detail herein. In the preferred embodiment, the gantry structure 105 moves reciprocally along the length of a vehicle on gantry guide rails 110. Rail wheels and a gear motor (neither shown) are contained within the gantry structure 105 to propel it back and forth. A preferred embodiment of the gantry also includes an idler wheel (not shown) that is in contact with the rail and coupled with a pulsar wheel and associated sensor (neither shown). The pulsar wheel sensor is coupled to the controller to provide the controller with signals concerning the rate of travel of the gantry. In the preferred embodiment, the gear motor is also coupled to the controller and is adapted to propel the gantry structure 105 at a plurality of selectable speeds (0.33 to 1.52 feet/second) along the rails. It is to be understood that in alternative embodiments, movement of the gantry structure relative to the vehicle being cleaned could be accomplished in any conceivable manner with or without the use of rails 110 that would be obvious to one of skill in the art. For instance, automobile 120 may merely drive through a fixed and stationary gantry structure. In another instance, the gantry 105 could be suspended from a ceiling and slide or roll along guides provided therein. Vehicle guide members 112 are also provided to help the driver of a vehicle properly position the vehicle under the gantry 105, at a proper distance from the sides of the gantry 105. An example of a gantry structure of the general type described is shown in U.S. Pat. No. 5,076,304 which is of common ownership with the present invention and which is hereby incorporated by reference.

As illustrated in FIGS. 21 and 22, inside and outside vehicle guide members 112, 113 and 114 are provided. The left and right outside guide members comprise both raised tubes 112 that run generally parallel to the gantry guide rails 110 and a guide platform 113 disposed on the inside of the raised tubes 112 that has inside vertical surfaces that are angled inwardly towards a set of front tire stops 115. A vehicle 120 enters the car wash by driving between the raised tubes 112. If the vehicle 120 approaches the front tire stops 115 too far to one side, the inside vertical surface of one of the guide platforms 113 impacts the outside of the vehicle's front tire and guides the vehicle 120 towards the tire stops 115. The inside guide member 114 comprises a generally V-shaped raised tubular structure that is centered relative to the inside surfaces of the left and right legs of the gantry with the vertex of the "V" facing the vehicle wash entrance. Accordingly, if the vehicle 120 strays to the left or right as it approaches the tire stops 115, the inner guide member 114 impacts the inside of the vehicle's front tire and guides the vehicle back towards a center position. As can be appreciated, the shortest distance between the vertical surfaces of the outer guide member's guide platform 113 must be greater than the widest track of the type of vehicle the vehicle wash is designed to service.

In a prior art wash system with only an outside guide member, a vehicle with a small track width can be positioned within the wash in such a manner such that the distance between the nozzles on one leg of the gantry and one side of the vehicle is much smaller than the distance between the nozzles on the other leg and the other side of the vehicle. The inside guide member 114 has a maximum width at the opening of the "v" shape that is smaller than the shortest distance between the inside surfaces of the tires on a vehicle having the smallest track that the vehicle wash system is designed to service. Advantageously, a vehicle with a small track width that is too far to the left or the right upon entering the vehicle wash will be guided by the inside guide member towards a center position between the left and right legs of the gantry, thereby minimizing the difference in distances between the side nozzles and the respective side surfaces of the vehicle.

Referring again to FIG. 1, the typical gantry structure 105 is in the form of an inverted-U having a left leg 205, a right leg 210, and a top span 215. Located along the front side of the gantry structure 105 is a dryer apparatus 220 designed to blow high velocity air onto a vehicle as the gantry 105 moves along and over the vehicle after the wash cycle has been completed. The high velocity air is generated by one or more fans (not shown) contained within the dryer apparatus housing and blown through ducting 222 and out vents 224 located on the three inside surfaces of the gantry 105. Alternative embodiments of the washing system 100 may not incorporate a dryer apparatus 220 or the apparatus 220 may be separate from the gantry structure 105.

Figure 2:
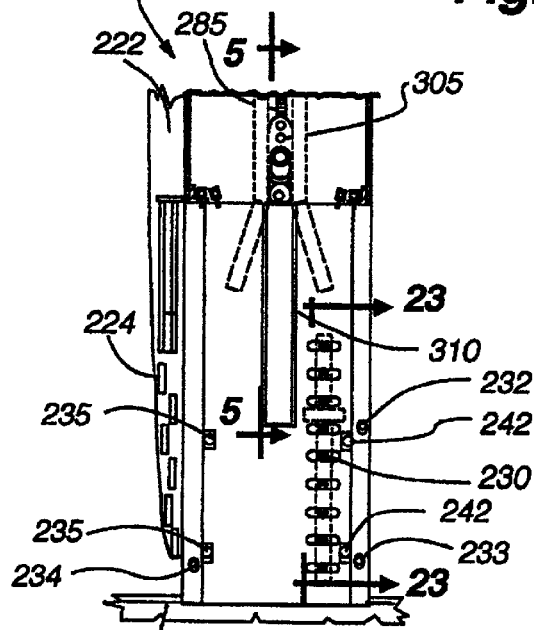
FIG. 2 is a fragmentary section taken along line 2—2 of FIG. 1.
Figure 3:
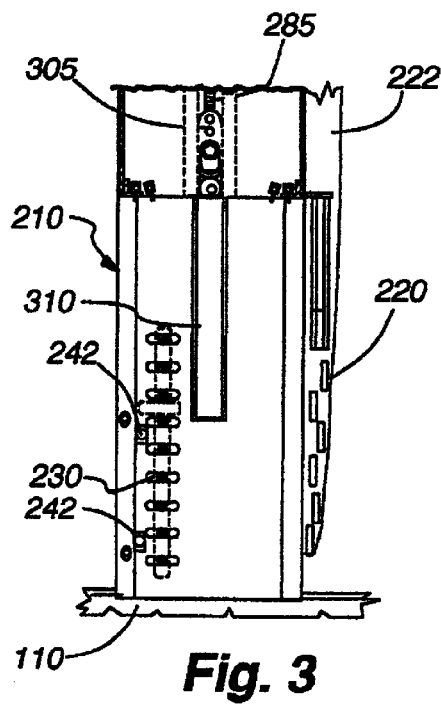
FIG. 3 is a fragmentary section taken along line 3—3 of FIG. 1.

Referring to FIGS. 2 & 3, a plurality of turbo nozzles 230 are distributed on the inside surface of the left and right legs 205 & 210 of the gantry structure 105 and are located in a vertical line between the front and rear of each of the legs in the lower portion of the legs corresponding generally to the side surfaces of a vehicle. The advantages of turbo nozzles over traditional 0 degree nozzles will be discussed in detail infra. Suffice it to say, the fluid jet from each turbo nozzle more effectively cleans a given area of the vehicle surface than traditional nozzles, thereby either reducing (1) the number of nozzles required or (2) the need to have the nozzles attached to rotating wand assemblies. It is to be appreciated that both turbo nozzles and traditional zero degree nozzles as described herein are high pressure nozzles wherein fluids supplied to these nozzles are under pressures typically in excess of 500 pounds per square inch (psi) to upwards of 1000 psi. The high pressure nozzles are typically utilized in a vehicle wash to supply a cleaning solution, which is typically soft water, to the surface of the vehicle in such a manner that the dirt and debris is dynamically removed from the vehicle's surface.

Figure 23:
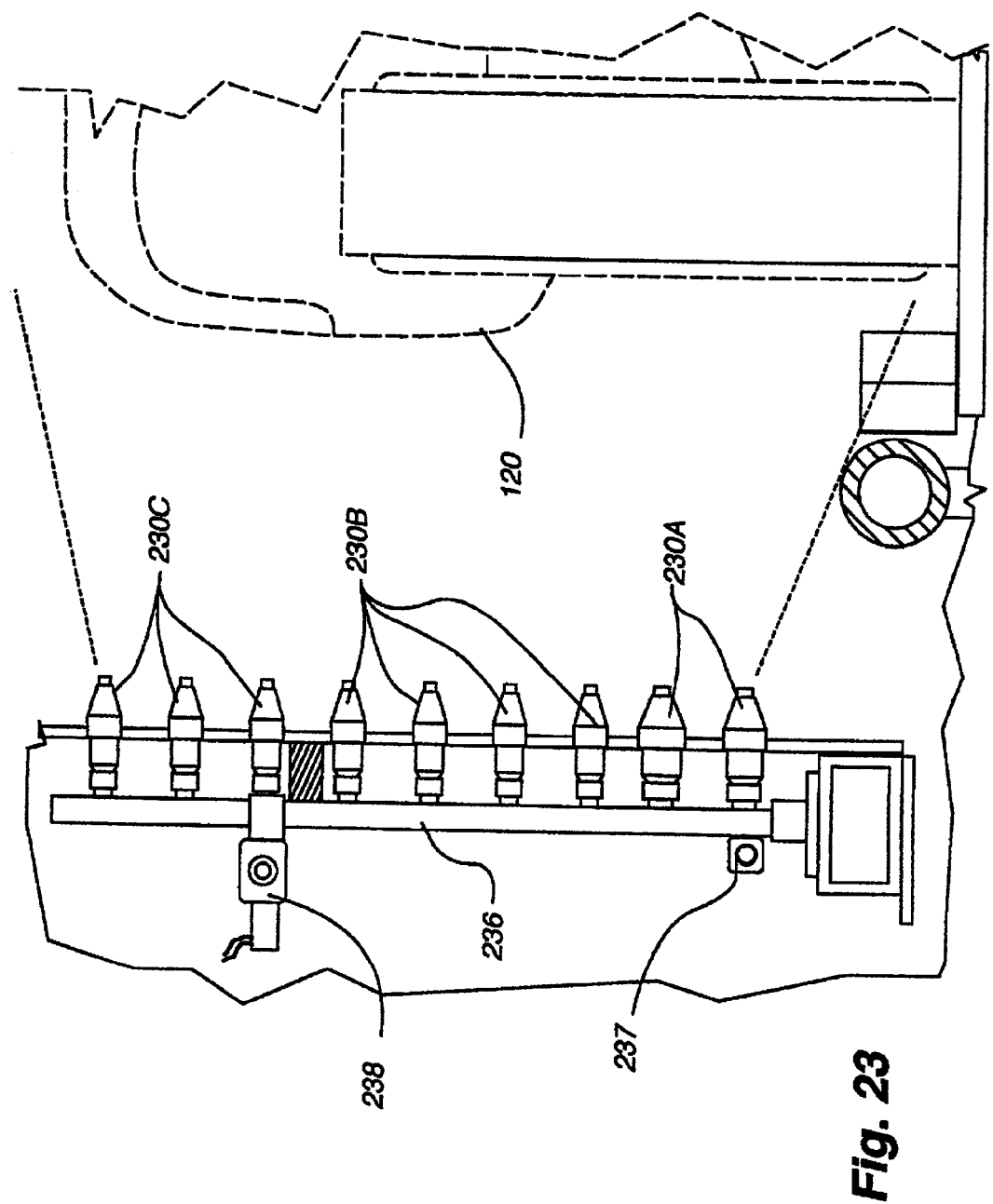
FIG. 23 is an enlarged fragmentary section taken along lines 23—23 of FIG. 2 illustrating a series of turbo nozzles.

A preferred configuration of the plurality of turbo nozzles 230, as illustrated in FIG. 23, comprises several rocker panel blaster nozzles 230A, several middle nozzles 230B for cleaning the side of the automobile and several upper nozzles 230C for cleaning the sides of the body that are typically vertically located above the hood. The rocker panel blasters 230A are typically high volume turbo nozzles that can effectively dislodge the types of debris, such as mud, that can accumulate on the rocker panels of a vehicle between washes. The middle and upper turbo nozzles 230B and 230C typically spray a lower volume of solution than the rocker panel blasters 230A since the middle and upper portions of a vehicle typically do have as much debris on them as the rocker panels. Generally, the plurality of turbo nozzles 230 located in each leg 105 of the gantry are connected in series to a manifold 236 and are turned on or off through a solenoid valve 237 located at the base of the manifold proximate a location where the manifold joins the solution supply line. Accordingly, the control system can control the supply of solution to the plurality of nozzles 230 depending on the operation being performed during a particular wash cycle. Additionally, a second solenoid valve 238 is provided along the manifold 236 between the middle and upper nozzles 230B and 230C such that the control system can turn the flow of solution to the upper nozzles 230C off or on depending on the location of the gantry relative to the side of a vehicle. Accordingly, the upper nozzles 230C can be turned off when the gantry is traveling over the hood or trunk of the vehicle since the jets emanating from these nozzles would not impact the side of the vehicle or could be turned on when traveling over the cabin of the vehicle which is higher on the sides.

A variation of the plurality of turbo nozzles 230 is contemplated wherein a third solenoid valve is specified to selectively control the flow of cleaning solution to the rocker panel blasters independent of both the middle and upper nozzles. It is to be appreciated that although the series of nozzles described herein are connected to a manifold in series, each of the sets of rocker panel, middle and upper nozzles can be attached to the manifold or multiple manifolds in parallel as would be appreciated by someone of ordinary skill in the art with the benefit of this disclosure.

Additionally, referring to FIGS. 2 and 3, several low pressure presoak solution nozzles 242 are distributed on the inner surface of the legs and the top span. These nozzles are typically configured to spray a detergent solution onto the vehicle as the gantry 105 passes over it. The key consideration in locating the presoak nozzles 242 is to insure that the vehicle can be completely covered in presoak solution. The relative force per area at which the presoak solution impacts the surface of the automobile is generally not important. Low pressure nozzles, such as the presoak nozzles and specialty solution application nozzles (as will be described below), typically operate at pressures between 50 and 150 psi. Variations of the invention may incorporate any number of different configurations of side nozzles to perform both the presoak and wash cycles as would be obvious to one of skill in the art with the benefit of this disclosure.

Figure 4:
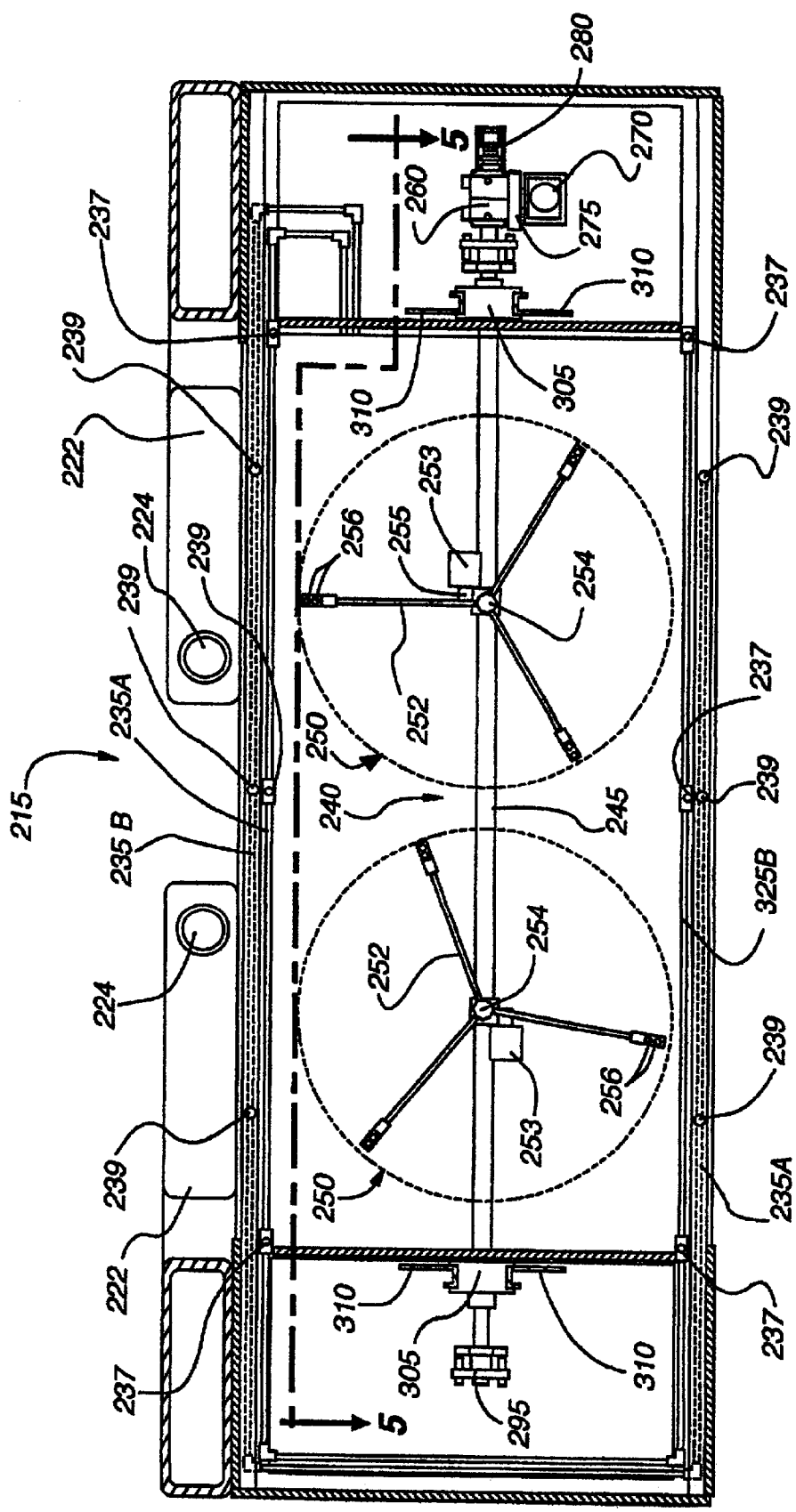
FIG. 4 is an enlarged section taken along line 44 of FIG. 1.

FIG. 4 is a view looking up at the inside of the top span 215. Two low-pressure fluid delivery tubes 235 (or manifolds) are located proximate the front and rear sides of the top span 215. Each of the fluid delivery tubes 235 is in operative connection with a reservoir of specialty fluid and a low-pressure pump (both not shown). Several low-pressure nozzles 237 & 239 are distributed on each of the low-pressure fluid delivery tubes 235 to spray specialty solutions, such as a clear coat, a soft water rinse or a spot free rinse (using reverse osmosis water) onto a vehicle. As with the application of presoak solution, the primary concern in applying a clear coat is obtaining complete coverage of the surface of a vehicle with relatively little concern regarding the force at which the solution impacts the surface when compared to dynamic application of cleaning solution by the high pressure nozzles. Although still low pressure nozzles, the spot free rinse is typically applied at slightly higher pressures (around 100 psi) using nozzles that have a greater volumetric capacity than the clear coat nozzles in order to induce a "squeegee" effect to ensure complete coverage of the vehicle. The low pressure nozzles 237 located proximate the intersection between the inner surface of the left and right legs and the inside of the top span may be angled inwardly towards the side surfaces of the vehicle so that the specialty solution is sprayed thereon. Depending on the embodiment, additional specialty solution nozzles maybe located on the inside of the right and left legs 205 & 210 to insure complete coverage of the side surfaces. Although two low-pressure fluid delivery tubes 235 are shown, it is understood that alternative wash systems may have more or fewer low-pressure fluid delivery tubes 235 located on the inside of the top span 215.

Figure 24:
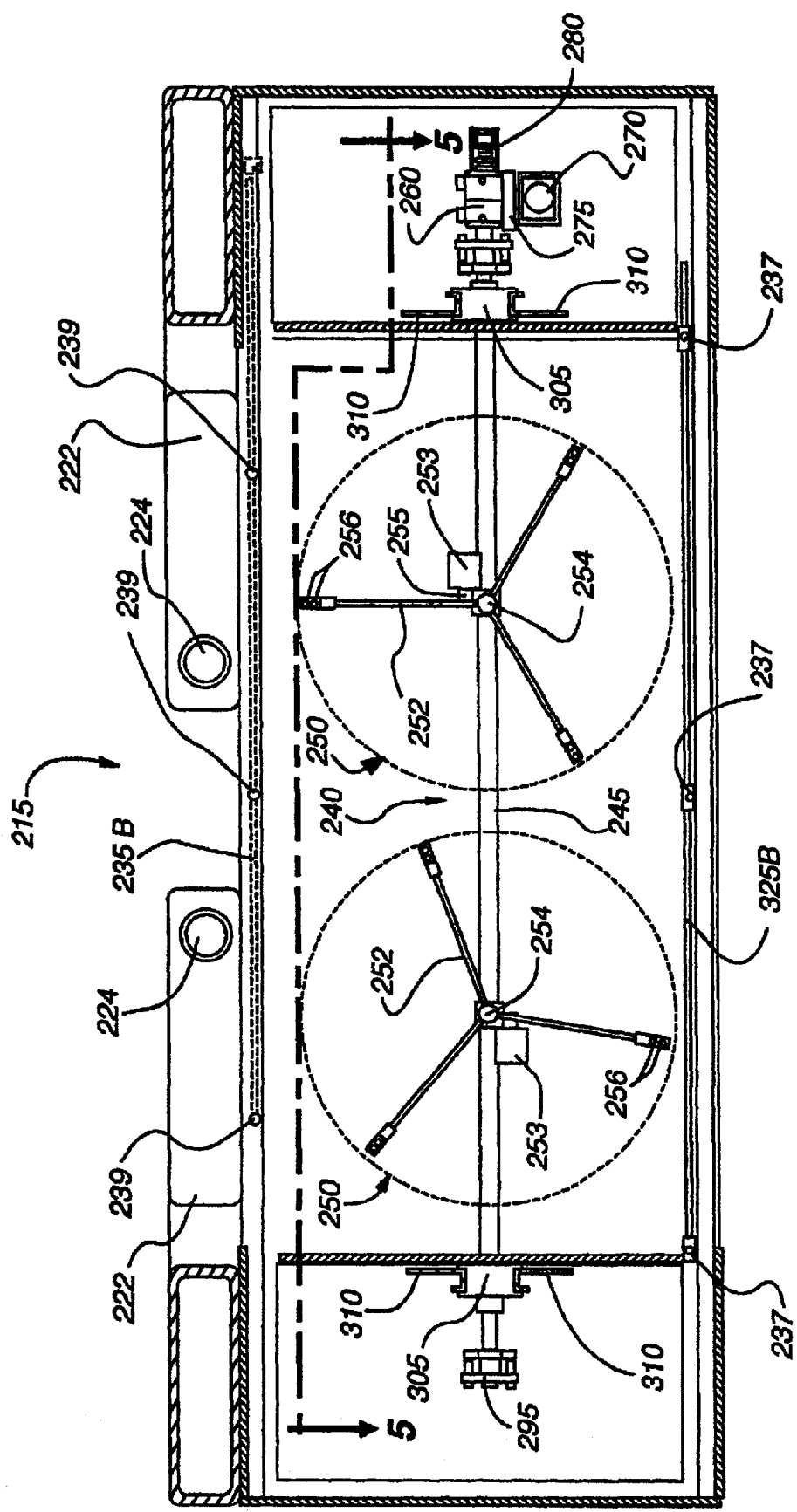
FIG. 24 is an enlarged section similar to FIG. 4 illustrating a variation in the configuration of the low pressure delivery tubes.

In a variation of the low pressure delivery tubes, as shown in FIG. 24, a clear coat or drying agent delivery tube 235A is located proximate the front or rear edge of the top span 215, as well as, the corresponding edge of the legs 205 & 210, and a spot free rinse (using reverse osmosis water) or soft water delivery tube 235B is located proximate the opposite edge of the top span 215. In operation, as the gantry passes over the vehicle, the clear coat or drying agent is first applied to the surface of the vehicle and has time to soak until the other edge of the gantry passes overhead and the spot free rinse (reverse osmosis water) or soft water solution is applied to the vehicle. Advantageously, the application of both specialty fluids can be performed in a single pass instead of two passes that would typically be required using prior art vehicle wash systems.

Figure 5:
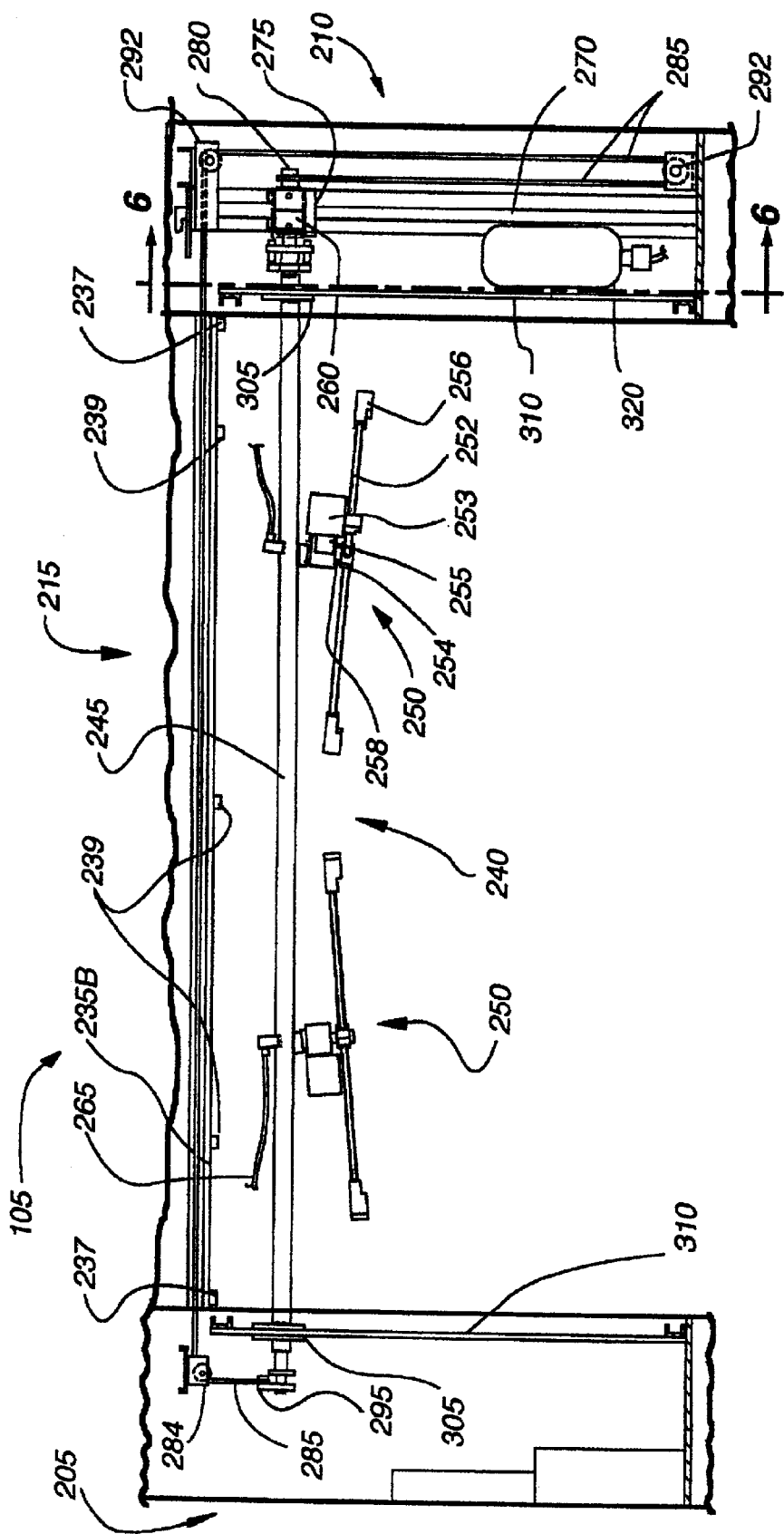
FIG. 5 is a fragmentary section taken along line 5—5 of FIGS. 2 & 3.
Figure 9:
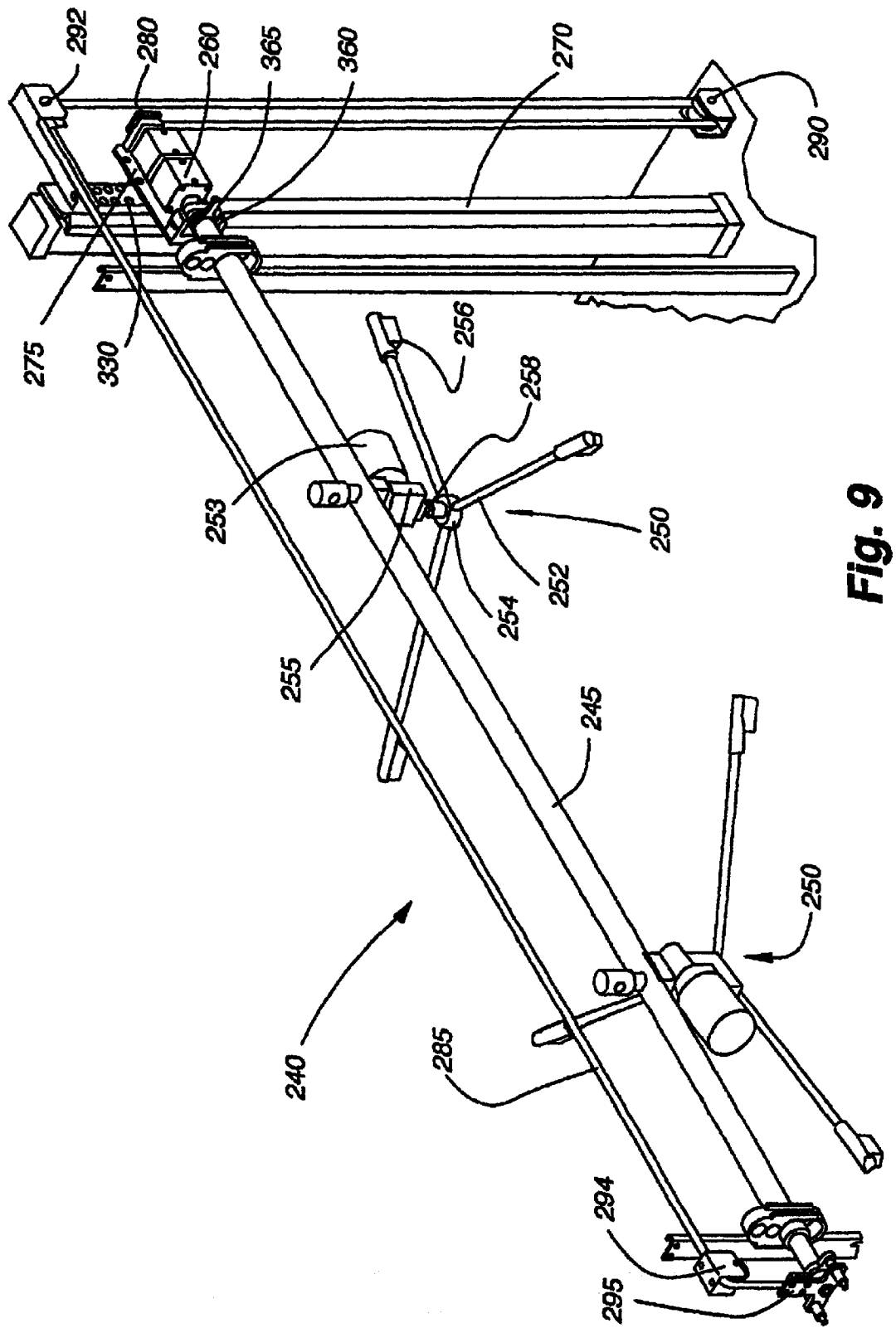
FIG. 9 is a fragmentary isometric of the pivoting boom assembly.

Again referring to FIG. 4, as well as, FIGS. 5 & 9, a moveable platform 240 is located at the proximate front-to-rear center of the inside or bottom of the top span 215 and is substantially coextensive with the top span 215. The moveable platform 240 comprises: (1) a pivoting boom 245; (2) two rotating wand assemblies 250 attached to the pivoting boom 245; (3) a reciprocating rotary pivotal actuator 260 pivotally attached to the pivoting boom 245; and (4) a mounting system to secure the moveable platform 240 to the gantry 105.

The rotating wand assemblies 250 each typically comprise three hollow wands 252 radiating from a rotating manifold 254. Each wand 252 is adapted to carry pressurized cleaning fluid therein and one or two zero-degree nozzles 256 are generally attached to its distal ends. In other variations, an oscillating nozzle or a turbo nozzle may be specified. The wand assemblies 250 are normally orientated on the pivoting boom 245 parallel to the ground such that the nozzles 256 spray a substantially vertical fluid jet. The rotating manifold 254 is both attached to and in fluid communication with a bearing seal element 258 that permits both rotational motion and the transfer of high pressure cleaning fluid to the manifold 254. Another end of the bearing seal element 258 is coupled with the shaft of a unidirectional motor 253 either directly or through a gear set 255. The unidirectional motor 253 is configured to facilitate the rotation of the wand assembly 250 at a predetermined speed. Additionally, a high-pressure fluid conduit 265 for transporting cleaning fluids is coupled with the bearing seal member 258. Various alternative embodiments of the cleaning fluid delivery systems are contemplated as would be obvious to one of ordinary skill with the benefit of this disclosure. One embodiment is described in detail later that utilizes reciprocating wands with turbo nozzles attached to their ends. Other variations, for example, might include stationary turbo nozzles disposed along the length of the pivoting boom 245, wherein the boom 245 may be adapted to serve as a cleaning fluid delivery conduit.

Referring to FIGS. 5 and 9, the moveable platform 240 is vertically supported in the gantry structure 105 at its right end by a pneumatic lift 270 in operative connection with an actuator bracket 275. The reciprocating pivotal actuator 260 is fixedly attached to the actuator bracket 275, and the right end of the pivoting boom 245 is attached to the shaft of the reciprocating pivotal actuator 260. A clamp member 280 extends perpendicularly from the actuator bracket 275 and a first end of a linear drive belt 285 is anchored thereto. From the first end, the drive belt 285 extends: downwardly and through a first idler pulley 290 near the base of the right leg 210; upwardly and through a second idler pulley 292 located at the top of the right leg 210; horizontally along the top span 215 and through a third idler pulley 294; and downwardly until terminating at a second end that is anchored to an inverted T-shaped clamp member 295 located at the left end of the moveable platform 240. The left end of the pivoting boom 245 is pivotally attached to the T-shaped clamp 295. Accordingly, the left end of the moveable platform 240 is suspended from the drive belt 285. In the preferred embodiment, the drive belt 285 is comprised of a Kevlar reinforced polymeric material, although in alternative embodiments, the belt may be comprised of any number of materials having the necessary strength characteristic to support the moveable platform 240. The belt may be replaced altogether with a suitable cable or chain. Additionally, any number of configurations are possible for routing the belt 285 from one side of the moveable platform 240 to the other.

Any weight imbalances in the rotating wand assemblies 250 may cause lateral forces to be induced in the moveable platform 240. To prevent unwanted lateral movement of the moveable platform 240 caused by the lateral forces, the moveable platform 240 is constrained by right and left slide members 305 that are each disposed between and slideably attached to two vertical guide rails 310 that extend a substantial portion of the length of each gantry leg (best seen in FIGS. 4, 10 & 11). The pivoting boom 245 passes through a vertically elongated bore 312 in each slide member 305. The elongated bores 312 have widths slightly greater than the diameter of the pivoting boom 245, thereby constraining the moveable platform 240 from any substantial lateral movement. In the preferred embodiment, each slide member 305 comprises two additional bores 314 & 316. Electrical cabling (not shown) from the unidirectional motors is typically routed through middle bore 316 on the right slide member 305, and the cleaning fluid conduit is routed through the upper bore 314 on both slide members 305. The slide members 305 are fabricated from a polymeric material such as Derlin® or nylon, but any suitable material may be utilized. Any number of alternative structures may be utilized to constrain the lateral movement of the moveable platform with or without the use of slide members and/or guide rails as would be obvious to one of ordinary skill in the art.

Figure 12:
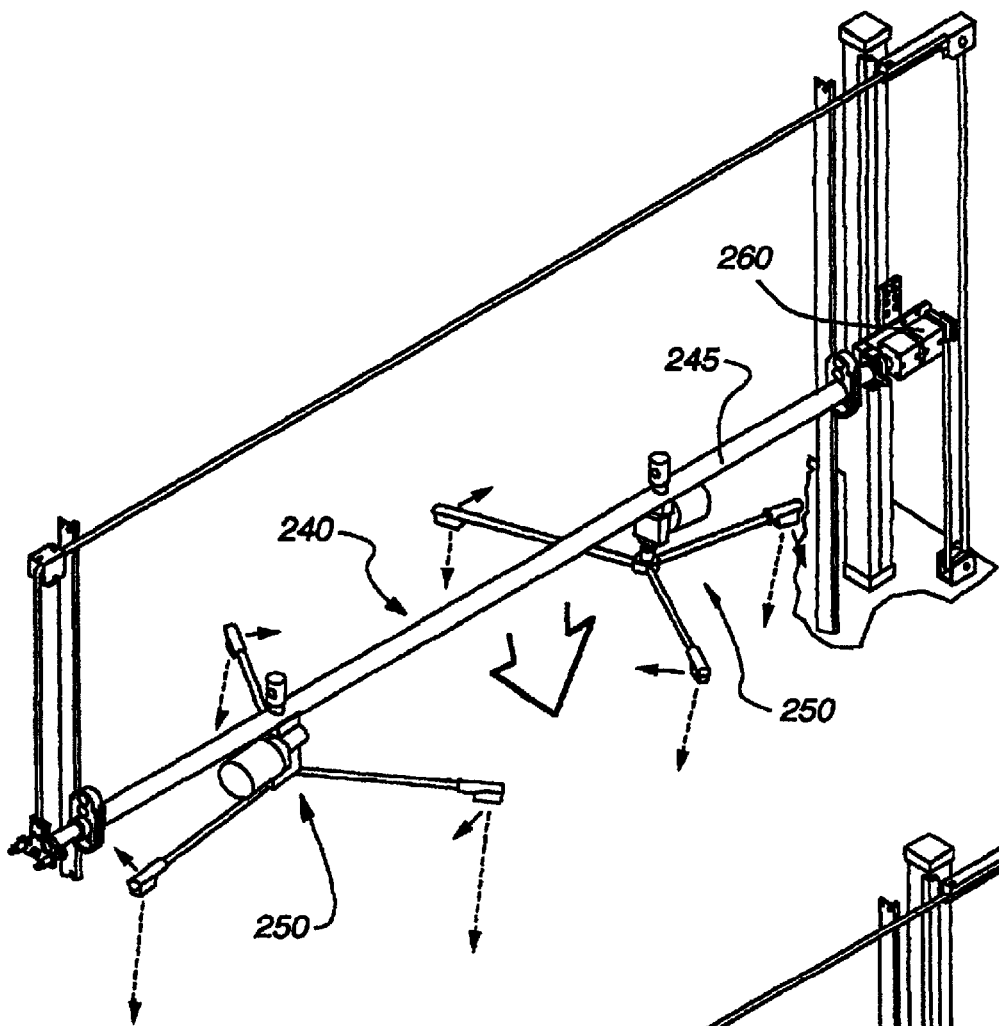
FIG. 12 is a fragmentary isometric of the pivoting moveable platform illustrating the downward vertical movement of the boom and the operation of the rotating wands.

To lower the moveable platform 240 as shown in FIG. 12, the pneumatic lift 270 is retracted, lowering the right side of the moveable platform 240. Simultaneously, the drive belt 285 travels through the idler pulleys 290–294 as indicated, increasing the length of the portion of the drive belt located between the inverted T-shaped clamp 295 and the third idler pulley 294, thereby lowering the left side of the moveable platform 240 a corresponding amount to that of the right side. To raise the moveable platform 240, the pneumatic lift 270 is extended, pushing the right end of the moveable platform 240 upwardly and pulling the drive belt 285 as to shorten the length of the portion between the inverted T-clamp 295 and the third idler pulley 294 to pull the left end of the moveable platform 240 upwardly.

Depending on the design and construction of the vertical lift system, a malfunction within the vehicle wash system, such as a compressor failure, a power failure, or an air leak, may cause the pneumatic lift 270 and the moveable platform 240 to lower, possibly on to the surface of a vehicle that is being washed. Accordingly, the preferred embodiment incorporates one or more fail-safe features that in the event of a malfunction, cause the moveable platform 240 to rise to the top of the gantry 105 and lock in its retracted position until normal operation can be restored. A pressurized air tank 320 (FIG. 5) is pneumatically coupled by way of one or more air hoses (not shown) with the pneumatic lift 270 providing a reservoir of compressed air to facilitate emergency operation of the lift 270 in the event of a malfunction. In one embodiment, a solenoid coupled with a pneumatic switch (neither shown) may be utilized to trigger the raising of the moveable platform 240. The switch may be triggered by a power failure or by a drop in pressure in the line supplying the actuator to below 65 psi (pounds per square inch). In operation, after a malfunction, the solenoid trips the normally closed pneumatic switch permitting pressurized air to travel from the air tank 320 to the pneumatic lift 270, causing the lift 270 to rise. As long as sufficient pressurized air remains in the tank 320, the moveable platform 240 will be retained in the retracted position. It is understood, that a wide variety of switch mechanisms as would be obvious to one of ordinary skill may be utilized to cause the moveable platform 240 to rise in the event of a power failure and the one described herein is merely illustrative.

Figure 7:
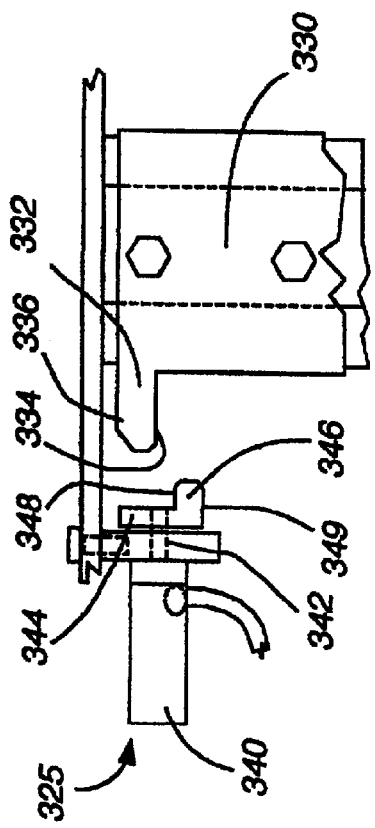
FIG. 7 is a section taken along line 7—7 of FIG. 6.
Figure 8:
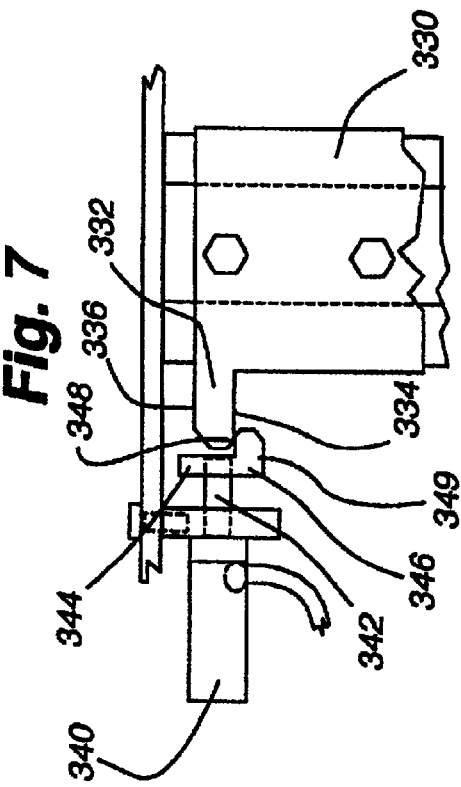
FIG. 8 is a section similar to FIG. 7 with components in a different position.
Figure 6:
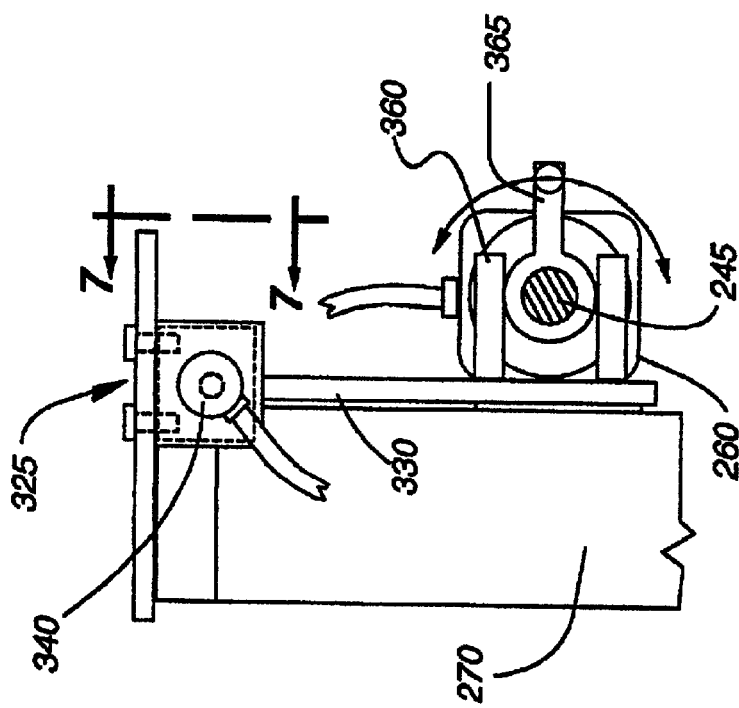
FIG. 6 is an enlarged fragmentary section taken along line 6—6 of FIG. 5.

A latch or locking mechanism 325 may also be utilized in certain embodiments to retain the moveable platform 240 in the retracted position after a power failure. One type of locking mechanism 325 is illustrated in FIGS. 6–8. A latch plate 330 extends vertically from the actuator bracket 275. At the top of the latch plate 330, a horizontal tongue 332 extends leftwardly. The top and bottom surfaces 336 & 334 of the tongue 332 are beveled. When the moveable platform 240 is fully retracted, the tongue 332 is located adjacent to a solenoid actuator 340. Preferably, the solenoid actuator 340 is pneumatic, wherein compressed air is routed into the solenoid when power to it is interrupted, causing a shaft 342 to extend rightwardly from the solenoid body. Alternatively, the solenoid may be spring loaded, wherein the spring biases the shaft 342 to the right. Attached to the end of the solenoid shaft 342 is a latch member 344 having a rightwardly extending tongue 346 corresponding to the leftwardly extending tongue 332. The rightwardly extending tongue 332 comprises beveled upper and bottom surfaces 348 & 349.

During a vehicle wash malfunction, the electrical current to the solenoid 340 is interrupted and compressed air encourages the solenoid shaft 342 into its extended position. If the moveable platform 240 is already in its retracted position, the upper surface 348 of the rightward extending tongue 346 will slide below and support the bottom surface 334 of the latch plate's leftwardly extending tongue 332, effectively locking the moveable platform 240 in its retracted position. If the moveable platform 240 is not retracted at the time of failure, the top beveled edge 336 of the leftwardly extending tongue 332 meets the rightwardly extending tongue 346 as the moveable platform 240 is raised, causing the solenoid's biased shaft 342 and the rightwardly extending tongue 346 to move leftwardly. Once the rightwardly extending tongue 346 is pushed back enough, the leftwardly extending tongue 332 passes it as the moveable platform 240 is returned to its retracted position, and the top surface 348 of the rightwardly extending tongue 346 is encouraged under the bottom surface 334 of the leftwardly extending tongue 332, thereby locking the moveable platform 240 in the retracted position.

Referring primarily to FIGS. 9–11, the reciprocating pivotal actuator 260 and other associated structure relating to the pivoting or rotating of the pivoting boom 245 will now be described. As was described above it is useful to pivot the boom 245 to change the direction of the fluid jets emanating from the nozzles 256 at the distal end of the wands 252 in order to more effectively clean the various surfaces of a vehicle. The shaft of the reciprocating pivotal actuator 260 is coupled with the pivoting boom 245 on the right end of the moveable platform 240. The pivoting boom 245 passes through the elongated bores 312 of the right and left slide members 305, both of which permit the boom 245 to pivot freely. On the left end of the moveable platform 240, the inverted T-clamp 295 is pivotally attached to the boom 240 by way of a bearing (not shown), thus the inverted T-clamp 295 may maintain its positioning, ensuring proper alignment between the clamp 295, the drive belt 285 and the third idler pulley 294. Attached to the distal ends of the inverted T-clamp's arms are two proximity sensors 350. Adjacent and just to the right of the sensor faces are two or more flat sensor plates 355 that radiate from the pivoting boom 245 at predetermined locations. In variations of the vehicle wash system, the sensors and associated sensor plates may be located in any number of suitable locations, such as the right side of the pivoting boom proximate the pivoting actuator. Depending on rotational orientation of the pivoting boom 245 relative to the inverted T-clamp 295, the plates 355 may cover the face of one of the sensors 350 causing the covered sensor 350 to transmit a signal to the control system (not shown). Based on the received signal, the control system can determine the pivotal position of the boom 245 (i.e. whether the boom is pivoted clockwise or counterclockwise) and activate or deactivate the reciprocating pivotal actuator 260 accordingly. It is to be appreciated that any number of sensor configurations can be utilized by a mechanical or computerized control system to determine the relative pivotal orientation of the boom 245. Additionally, in some embodiments the need to use sensors 350 to determine the position of the boom may be obviated by the use of advanced reciprocating actuators that are capable of accurately pivoting the boom 245 a specified amount based only on the appropriate input from the control system.

Referring to FIG. 11 illustrating the right end of the moveable platform 240, the base of a short c-shaped channel 360 is adjustably mounted against the vertical surface of the actuator bracket 275 at a lengthwise location between the right slide member 305 and the reciprocating pivotal actuator 260. The legs of the c-shaped channel 360 extend over and under the corresponding section of the pivoting boom 245. A radial arm 365 is attached to the pivoting boom 245 at the same proximate location along the boom 245 that the legs of the c-channel 360 extend over the boom 245. When the moveable platform 240 is in its retracted position with the nozzles 256 aimed vertically downwardly, the radial arm 365 is generally centered between the planes formed by the inside surfaces of the upper and lower legs. Together, the radial arm 365 and the c-channel 360 serve to control the clockwise and counterclockwise positions of the pivoting boom 245. For instance, if the pivotal actuator is engaged to rotate the boom 245 clockwise, movement of the boom is stopped when the radial arm impacts the lower arm of c-channel 360. Likewise, if the pivotal actuator is engaged to rotate the boom 245 counterclockwise, movement of the boom is stopped when the radial arm impacts the upper arm of c-channel 360. The amount of pivotal movement in either direction may be adjusted by moving the c-channel inwardly or outwardly relative to its mounting location on the actuator bracket. Accordingly, if the c-channel is moved away from the mounting bracket, the radial arm will impact the ends of the c-channel arms sooner lessening the pivotal movement. Conversely, by mounting the c-channel as close as possible to the bracket, the radial arm must pivot further before impacting the ends of the c-channel. Ideally, the c-channel and radial arm are adjustable to permit between 60 and 90 degrees of pivotal movement in both the clockwise and counterclockwise directions. Stops to limit pivotal motion, such as the c-channel and radial arm assembly, may not be utilized in all embodiments of the invention. For instance, an advanced reciprocating pivotal actuator can be utilized that is capable of precisely controlling the amount pivotal movement of the boom obviating the need for external mechanical stops.

In general, the pivotal movement of the pivoting boom 245 is independent of the vertical position of the moveable platform 240 thus permitting the car wash system 100 to adjust to vehicles of a number of different profiles. This is different from many prior art systems wherein the tilt of a moveable platform to which overhead nozzles are attached depended directly on the vertical position of the movable platform. That having been said, certain embodiments may limit the pivotal movement of the moveable platform 240 until it is lowered vertically a minimum distance to prevent the distal ends of the rotating wands 252 from impacting the top span 215 of the gantry structure 105.

Figure 26:
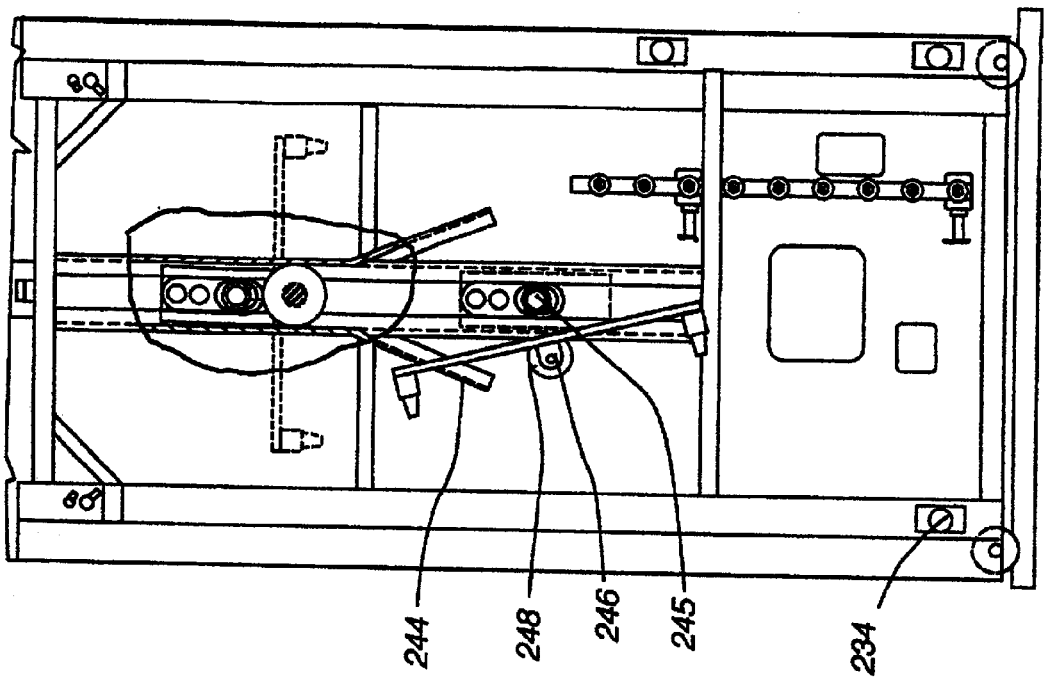
FIGS. 25 and 26 are side views of one leg of the gantry with cut away portions illustrating a pivoting boom centering mechanism according to one variation of the present invention.
Figure 25:
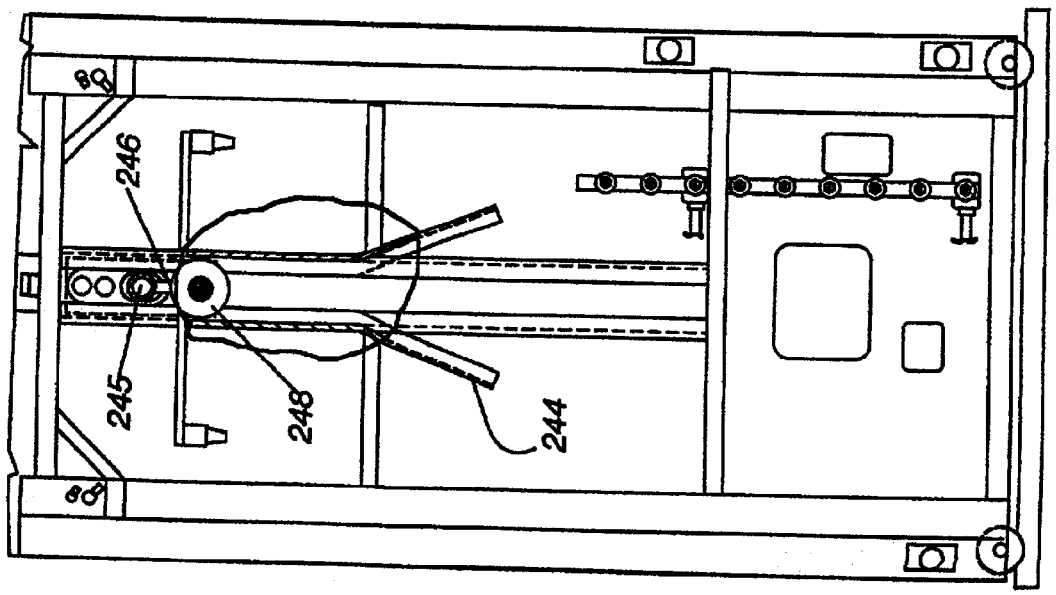
Figure 29:
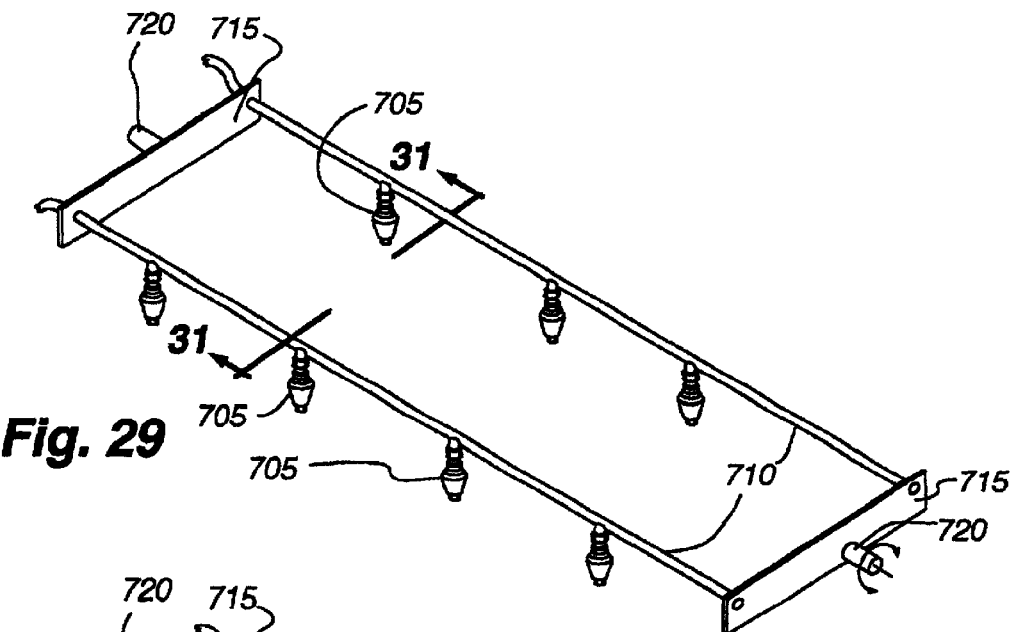
FIGS. 29 and 30 are fragmentary isometrics of a portion of a second alternative pivoting moveable platform that utilizes turbo nozzles attached directly to a twin tube boom in place of the rotating or pivoting wand assemblies.
Figure 30:
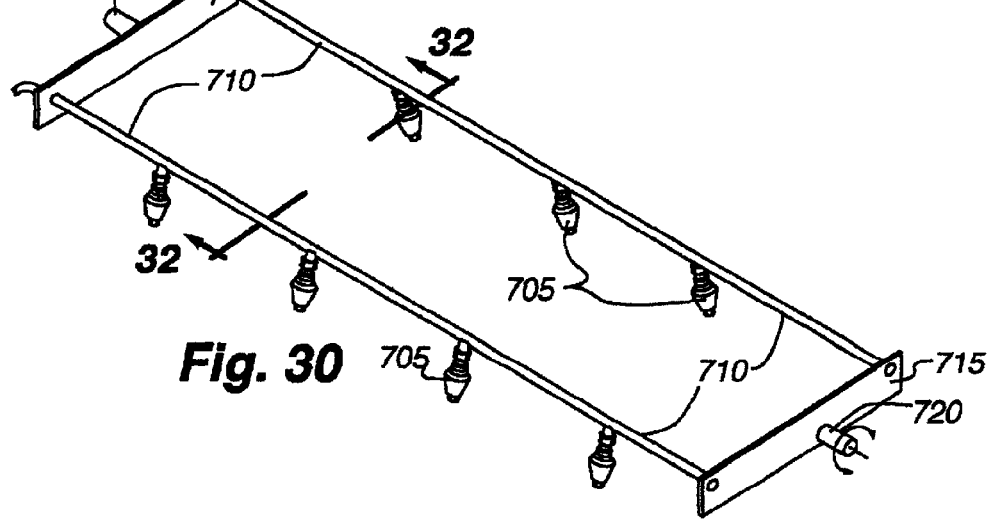
Figure 31:
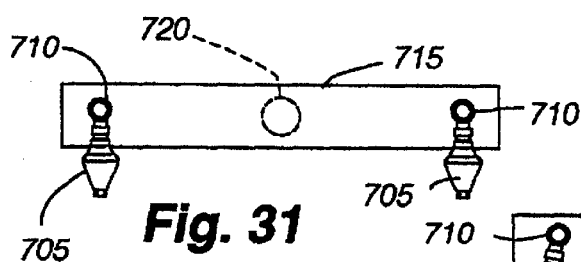
FIGS. 31 and 32 are sectional views of the second alternative pivoting moveable platform taken along lines 31—31 and 32—32 of FIGS. 29 and 30 respectively.
Figure 32:
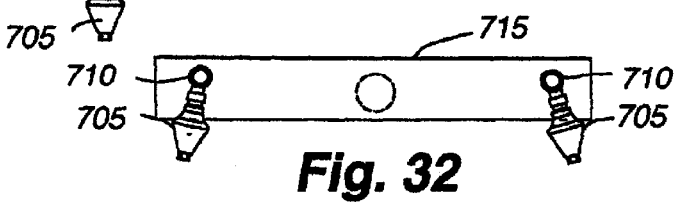

In a variation of the pivoting mechanism, the reciprocating pivoting actuator 260 is actuatable to pivot the pivoting boom 245 either to the right or the left from the centered position; however, it is not configured to return the boom 245 to the centered position once it has been pivoted, nor is it configured to hold the boom in the centered position. To accomplish these tasks a centering mechanism, as illustrated in FIGS. 25 and 26, is provided wherein the pivoting boom 245 is returned to its centered position when the moveable platform 240 is retracted. The centering mechanism comprises a pair of spaced parallel tracks 244 that are positioned on either side of the pivoting boom 245. At a common vertical location, the two tracks 244 diverge from each other at an acute angle, such that the two tracks when viewed together have an inverted Y-shape. The centering mechanism also comprises a downwardly extending arm 246 that is fixedly attached to the pivoting boom 245 at a distal end and has a wheel 248 rotatably attached to its proximal end. The wheel 248 is normally positioned between the spaced and parallel tracks 244 when the pivoting boom 245 is in its retracted position as shown in FIG. 29. It can be appreciated that in this position the boom 245 cannot be pivoted but it can be freely moved up or down as part of the moveable platform 240 to adjust the distance between the nozzles 256 or 405 attached therewith and the top of a vehicle. Once the wheel 248 is lowered below the location, where the tracks 244 diverge the reciprocating pivoting actuator 260 can be activated to pivot the boom 245. Referring to FIG. 26, as the boom 245 is retracted from the lowered and pivoted position, the wheel 248 impacts one of the divergent tracks 244 and guides the pivoting boom 245 back into its centered position.

Figure 13:
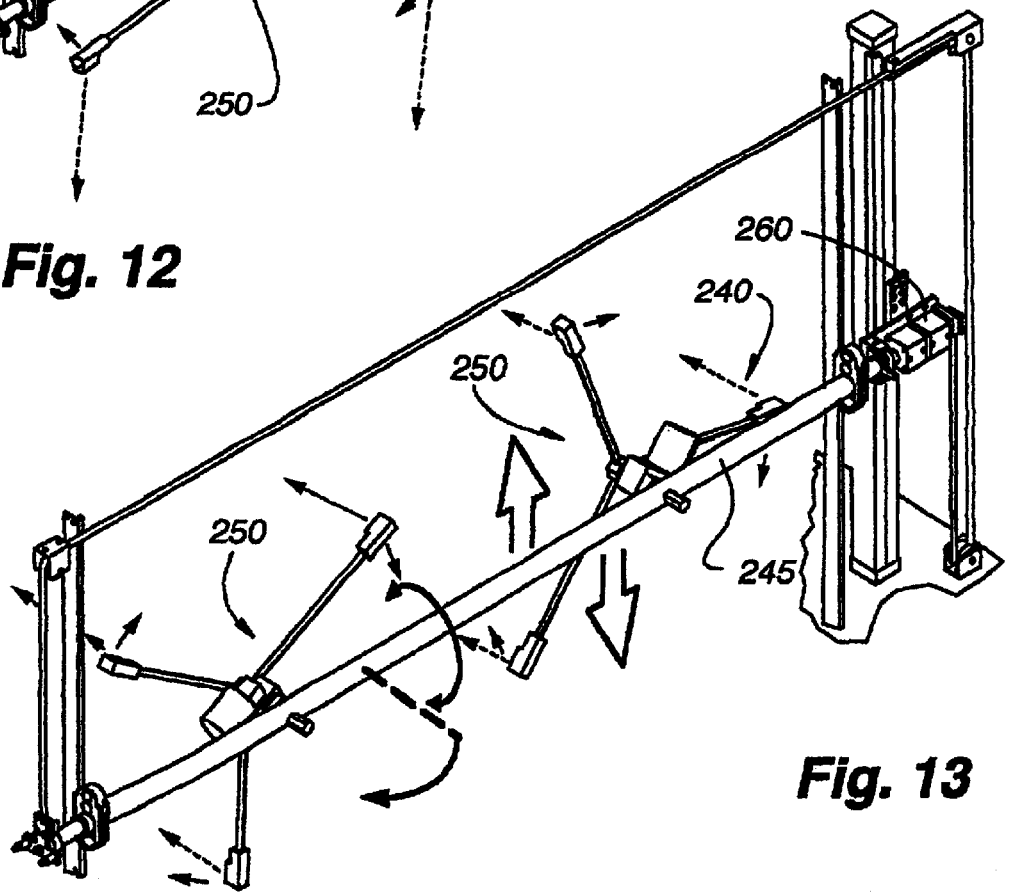
FIG. 13 is a fragmentary isometric of the pivoting moveable platform similar to FIG. 12 illustrating the orientation of the pivoting boom after a clockwise rotation.
Figure 14:
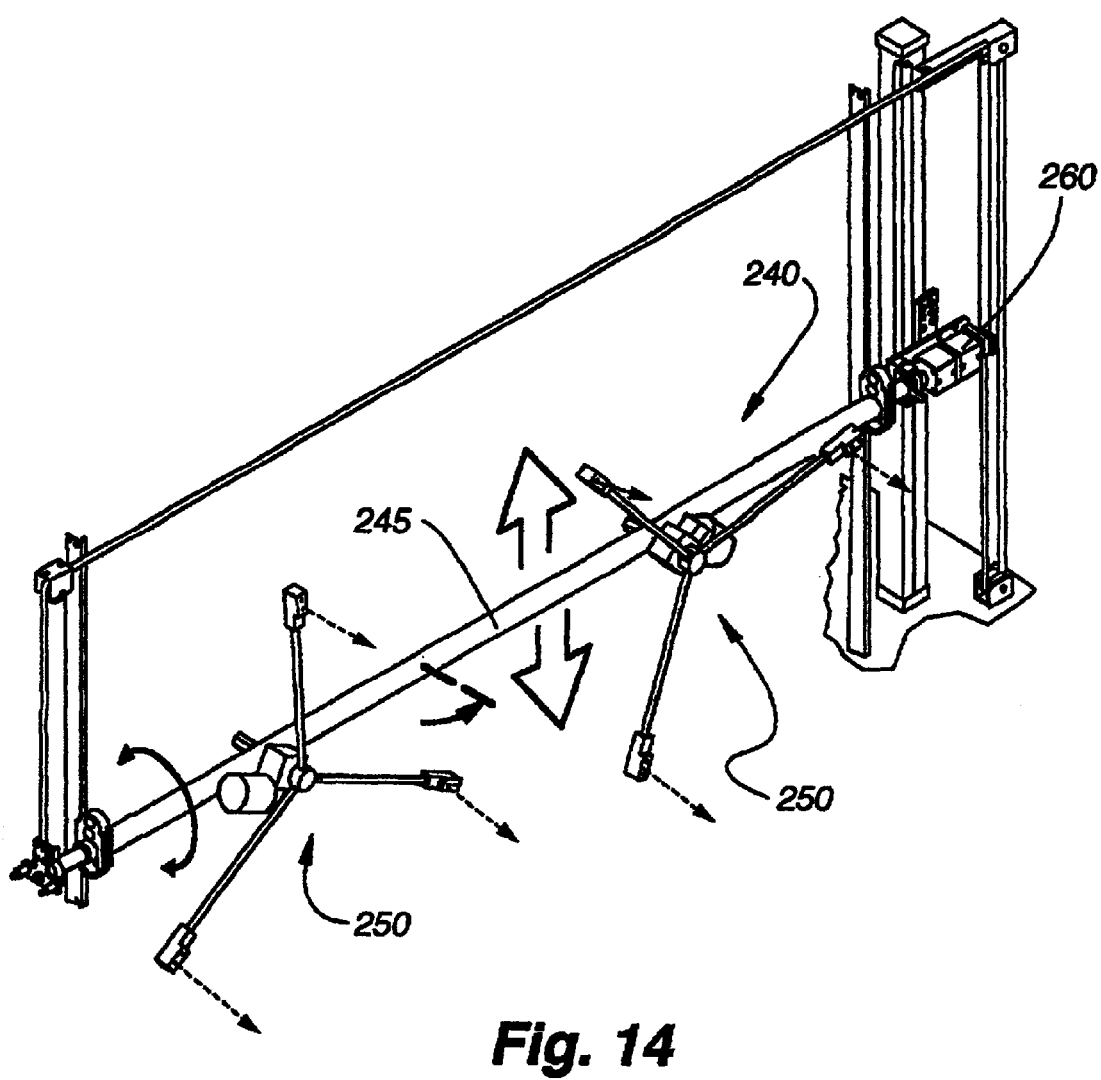
FIG. 14 is a fragmentary isometric of the pivoting moveable platform similar to FIG. 12 illustrating the orientation of the pivoting boom after a counterclockwise rotation.
Figure 15:
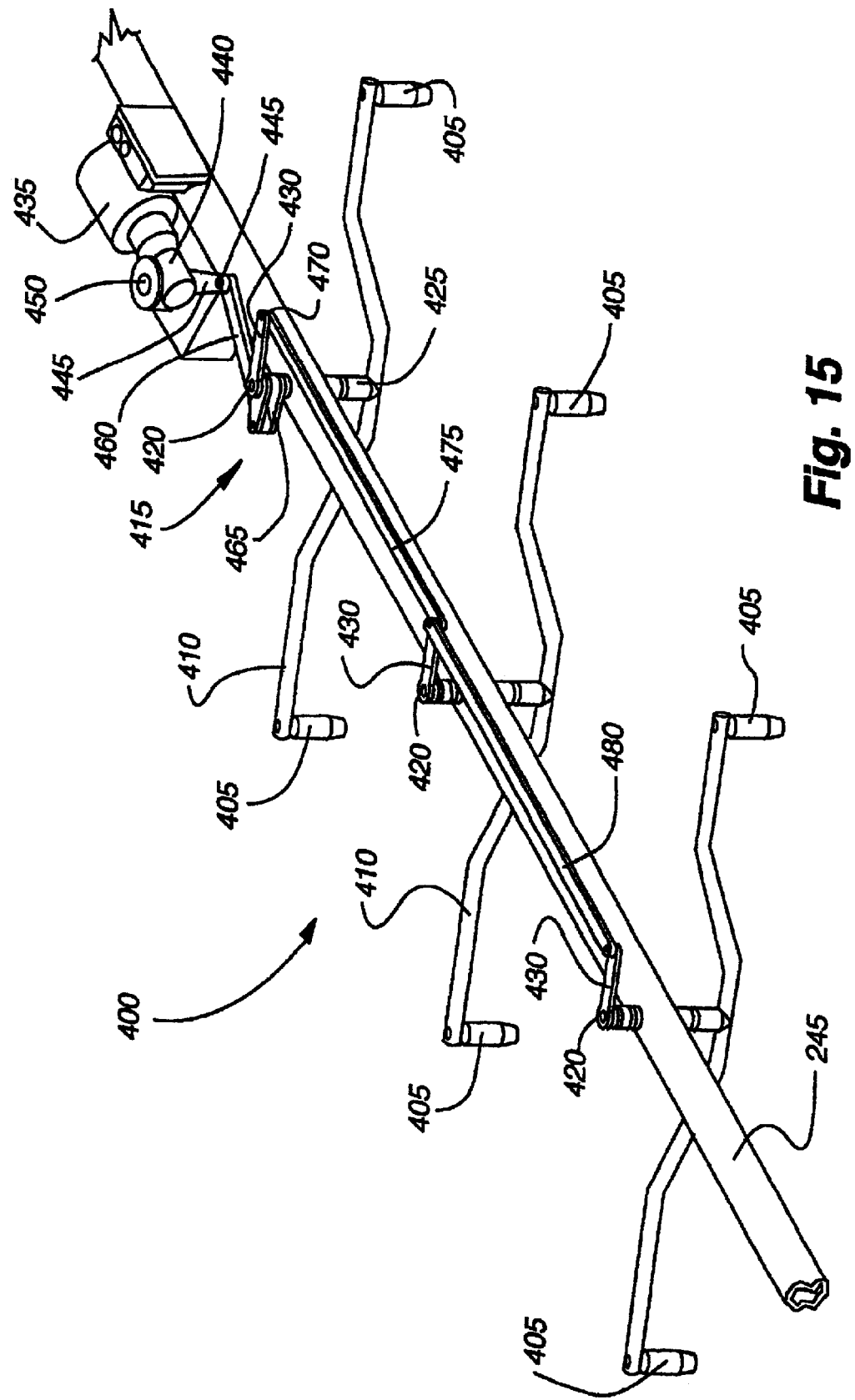
FIG. 15 is a fragmentary isometric of a portion of a first alternative pivoting moveable platform that utilizes reciprocating wands and turbo nozzles in place of the rotating wands.

The pivoting operation of the moveable platform 240 will now be briefly described. First, to clean the front end of a vehicle as shown in FIG. 13, the gantry 105 is moved into a position forwardly of the front end of the vehicle. Next, the moveable platform 240 is lowered vertically at least the minimum amount. At this point, a pneumatic switch is opened by the control system, permitting compressed air to enter the proper chamber of the reciprocating pivotal actuator 260, causing the pivoting boom 245 to rotate clockwise. The pivoting boom 245 will continue to pivot until stopped when the radial arm 365 impacts the lower arm of the c-channel 360. It is noted that the moveable platform 240 may be moving vertically while the boom 245 is pivoting. When the front end cleaning cycle has been completed, the moveable platform 245 is raised and the pivoting boom 245 is pivoted counterclockwise back into its retracted position. To clean the rear surfaces of the vehicle, the gantry 105 is moved behind the vehicle and the process is repeated except that the boom 245 is pivoted counterclockwise until the radial arm 365 impacts the upper c-channel arm.

Given the manner in which the moveable platform 240 may be raised and lowered vertically combined with the independent pivotal movement of the boom 245, it is appreciated that depending on the control system utilized by the washing system 100, the operation of the moveable platform 240 may be customized to any number of vehicles to maximize cleaning effectiveness. First, The vertical position of the nozzles may be adjusted for the height of the vehicle being washed, and to account for the different heights between a hood/truck and the roof of the cabin. Accordingly, the nozzles can be maintained at the optimum distance from the upper surface of the car to maximize cleaning effectiveness. Second, the boom 245 can be pivoted to an angle of 60–90 degrees so the nozzles can directly face the front and rear ends of the vehicle and more effectively clean the ends when compared to prior art wash systems that spray the front and rear surfaces at shallow acute angles. While jets of fluid are sprayed onto the front or rear ends at angles that are nearly perpendicular, the platform may be moved up and down as appropriate to ensure the entire front surface is washed. Accordingly the front and rear ends of a high profile vehicle such as an SUV may be cleaned as effectively as a lower profile vehicle such as a sedan. As the gantry 105 moves rearwardly, jets of fluid are sprayed on the hood. As the gantry 105 moves over the windshield, the pivoting boom 245 may be pivoted to an angle whereby the nozzles directly face the windshield. As jets of fluid are sprayed onto the windshield at approximately a right angle, the gantry moves towards the top-rear of the windshield and the platform 240 rises as necessary to maintain a predetermined spacing between the nozzles and the windshield surface. As the gantry 105 moves over the roof of the car, the pivoting boom 245 pivots back to a position where the wands are horizontally disposed.

Figure 20:
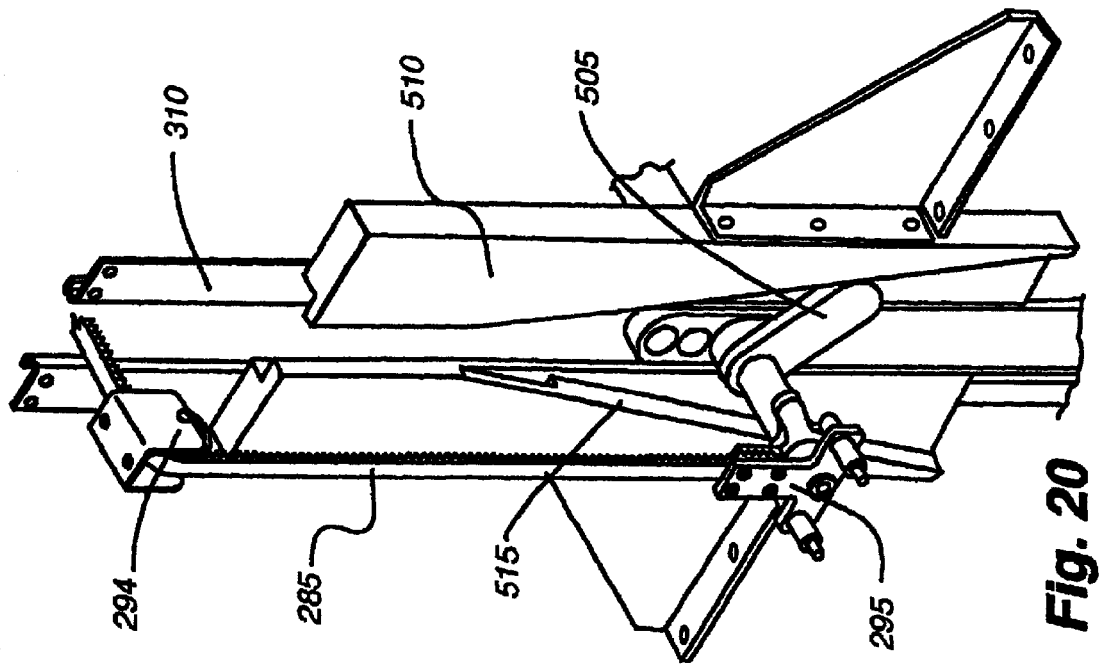
FIGS. 19 and 20 are fragmentary isometric views looking at the outside and inside respectively of the left leg of the gantry in an alternative tilting mechanism.

As has been discussed above, the exemplary embodiments described herein are not intended to limit the scope of the invention. Many alternative embodiment gantry-type vehicle wash systems have been contemplated that retain one or more of the innovative aspects of the invention. A first alternative embodiment is illustrated in FIGS. 15–18, wherein the rotating wand assemblies are replaced with reciprocating wands that utilize turbo nozzles. A second alternative embodiment is illustrated in FIGS. 29–32, wherein turbo or oscillating type nozzles are affixed directly to a pair of parallel and spaced boom tubes. A third alternative embodiment is illustrated in FIGS. 19 and 20, wherein the amount (or degree) of tilt of the pivoting boom is controlled based on the vertical position of the pivoting boom.

A First Alternative Embodiment

Figure 17:
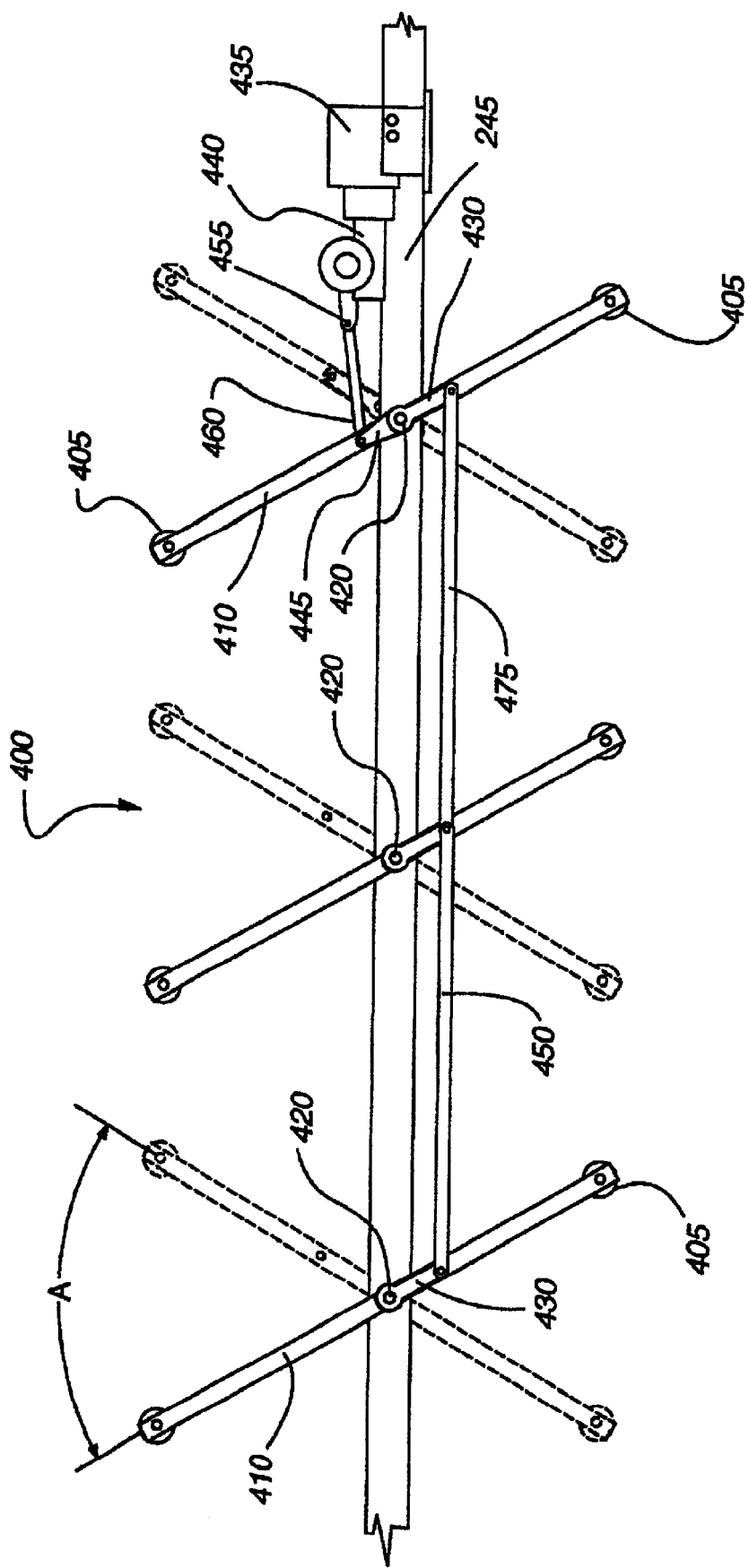
FIG. 17 is a fragmentary top plan view illustration of the first alternative pivoting moveable platform showing the range of reciprocating movement of the wands.

With reference to FIG. 17, the reciprocating wand assembly 400 of a first alternative embodiment is shown mounted on the pivoting boom 245 which has been adapted to serve as a high pressure fluid delivery manifold as well. The pivoting boom 245 is connected to a supply (not shown) of pressurized liquid to be sprayed onto the vehicle and supports three equally spaced reciprocating wands 410 through vertical hollow pivot shafts 420 associated with each wand 410. It is to be appreciated that the hoses that supply the pressurized liquid (cleaning solution) are coupled to a dump valve (not shown), typically located well below the pivoting boom 245 on the framework, for reasons that will be made apparent below. The shafts 420 are mounted on appropriate bearings 425 that allow the wands to reciprocate in a horizontal plane through their operative connection with a drive/link system 415. Each hollow pivot shaft is in fluid communication in a conventional manner with the interior of the pivoting boom 245 so that liquid within the manifold boom can pass from the manifold into the interior of the hollow pivot shaft. Each pivot shaft is, in turn, in fluid communication with the interior of each wand 410, which is also of hollow tubular configuration, so that liquid from the manifold can be passed into the wands in equal quantities. Each wand has a turbo nozzle 405 mounted at each end thereof with the nozzles being directed downwardly to direct a cyclical conical spray of fluid in a downward direction and in a manner to be described in more detail hereafter.

Each pivot shaft 420 has a crank link 430 fixed thereto adjacent to its uppermost end with the crank link being keyed to the shaft so that pivotal movement of the crank link in a horizontal plane about the vertical axis of the pivot shaft causes the pivot shaft 420 and the connected wand 410 to reciprocate in a corresponding manner. The drive/link system 415 includes a drive member 435 and a plurality of crank and link members that interconnect the drive member with the reciprocating wands. In the first alternative embodiment, the drive member is an electric motor having an output shaft (not seen) operably connected through a gear box 440 to a primary crank arm 445 that is rotated in a horizontal plane about a vertical output shaft 450 of the gear box. The distal or free end 455 of the primary crank arm is pivotally connected to a drive link 460 whose opposite end is pivotally connected to a bifurcated secondary crank arm 465 that is keyed to the vertical pivot shaft 420 of the first reciprocating wand 410, i.e. the wand that is closest to the motor 435.

As will be appreciated, when the drive motor 435 is driven in either direction, the primary crank arm 445 rotates and causes the drive link 460 to pivot in a horizontal plane while being slid reciprocally within the horizontal plane along a path parallel to the length of the pivoting boom 245. This sliding and reciprocating movement of the drive link causes the secondary bifurcated crank arm 465 to pivot back and forth in the same horizontal plane about the vertical shaft 420 of the first reciprocating wand thereby causing that vertical shaft, the connected wand and the associated crank link 430 to reciprocate in a corresponding manner. The free end 470 of the first crank link is pivotally connected to a first connecting link 475 whose opposite end is pivotally connected to the free end of the crank link 430 of the second wand 410 (i.e. the wand closest to the first wand). A second connecting link 480 longitudinally aligned with the first connecting link 475 is pivotally connected to the free end of the second crank link at the same location as the first connecting link and has its opposite end pivotally connected to the crank link 430 associated with the third wand 410 or the wand that is furthest removed from the drive motor 435.

It is important to appreciate that the crank links 430 and the bifurcated secondary crank arm 465 are relatively short so that the connecting links 475 and 480, which interconnect adjacent crank links, are positioned parallel to and are closely adjacent to the pivoting boom 245. In the preferred embodiment, the connecting links and crank link are no more than ¾ of an inch from the manifold and preferably about ½ inch. This provides for a very compact system for reciprocating the wands 410 as will be described hereafter. The compactness is important inasmuch as the manifold, as described previously, may be mounted to pivot about its longitudinal axis or an axis parallel thereto so that the spatial orientation of the wands 410 can be changed between horizontal and vertical or any angle therebetween, and the close proximity of the links and crank arms to the manifold allows this to be accomplished without an unwieldy mechanism.

In operation, it will be appreciated that as the drive motor 435 is operated, its output shaft causes the primary crank 445 to rotate thereby causing the connected drive link 460 to reciprocate effecting reciprocation of the secondary bifurcated crank arm 465 in a horizontal plane which, in turn, causes the connected pivot shaft 420 of the first wand 410 to pivot about its longitudinal axis a corresponding amount. That same pivotal movement is transferred to the first crank link 430 with the pivotal movement of the first crank link being transferred from the first crank link to the second crank link through the first connection link 475 and from the second crank link 430 to the third crank link 430 through the second connection link 480. Each reciprocating wand is thereby enabled to pivot in unison in a horizontal plane as illustrated best in FIG. 17. In FIG. 17, it can be seen from the full line and dashed line positions of the reciprocating wands that the associated nozzles are pivoted back and forth along an arc "A" a predetermined degree which, when associated with the spray pattern of the nozzles on the reciprocating wands as described later, provide complete coverage of the surface of a vehicle being washed with the apparatus.

Figure 16:
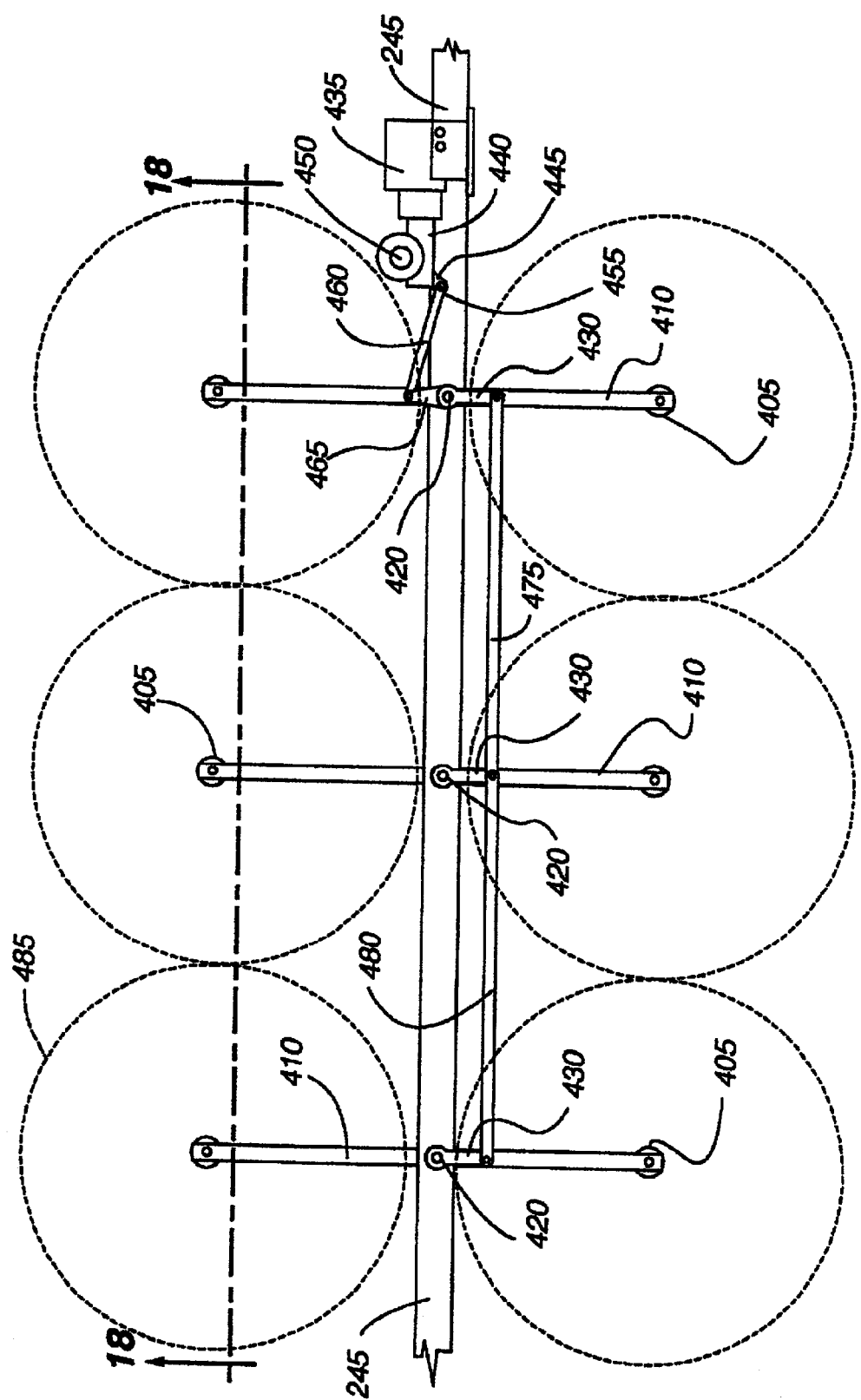
FIG. 16 is a fragmentary top plan view illustration of the alternative pivoting moveable platform showing the spray pattern of the turbo nozzles.
Figure 18:
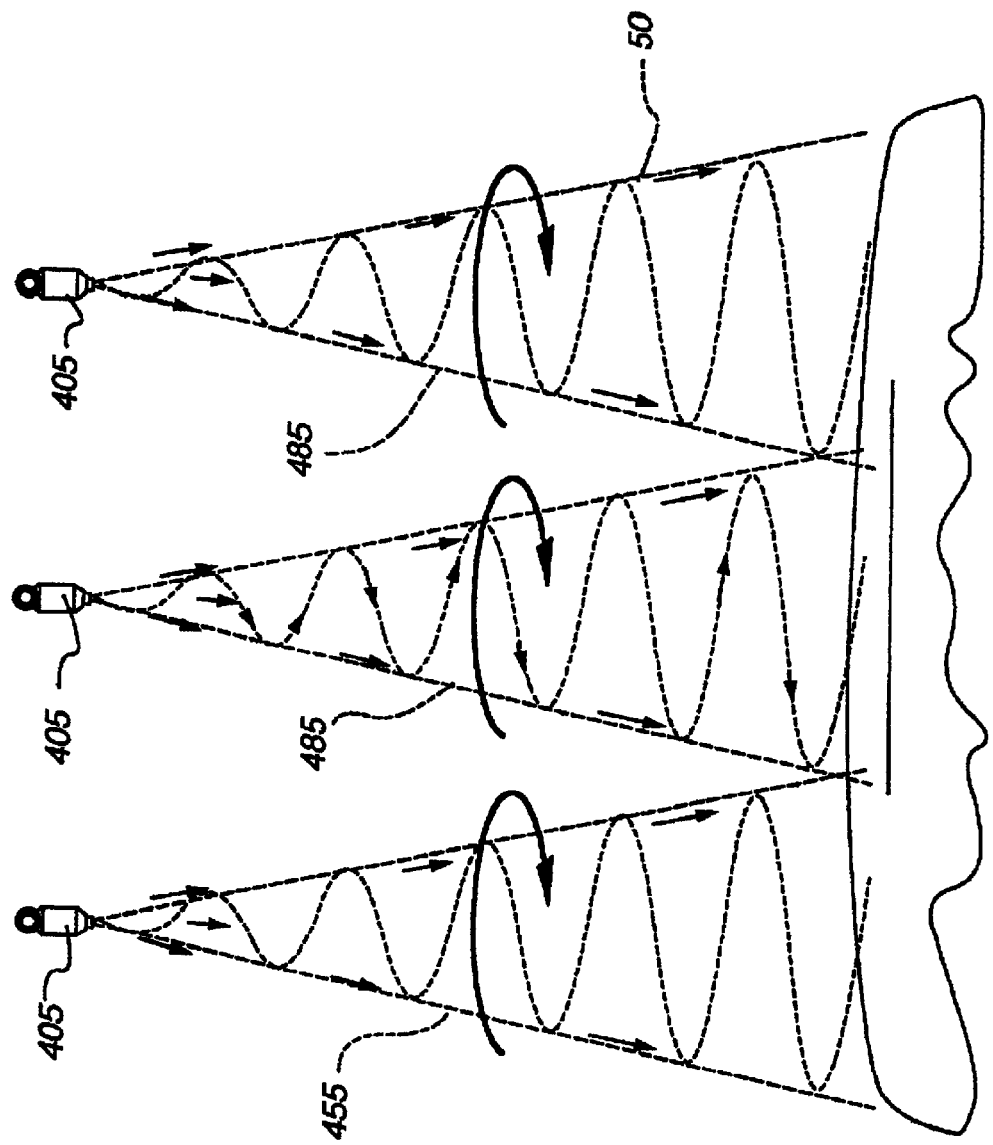
FIG. 18 is a section taken along line 18—18 of FIG. 16.
Figure 19:
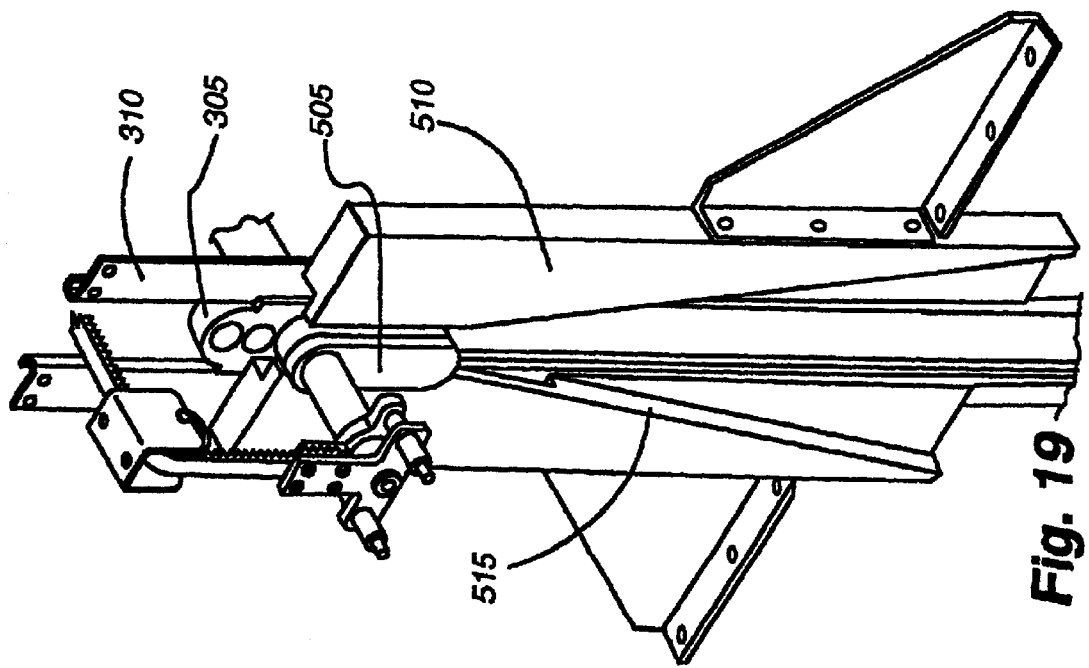

As best appreciated by reference to FIGS. 16 and 18, each turbo nozzle 405 emits a beam or stream of liquid in a straight line that is directed at an acute angle from a central axis of the nozzles. The straight beam or stream of liquid emitted from the nozzle is caused to move, by the nozzle's internal construction, in a circulating pattern which creates a conical wall or pattern of liquid 485 which, of course, is circular in transverse cross section as illustrated in FIG. 16. Fast rotating turbo nozzles (approximately 1600 to 2000 revolutions per minute (rps)) are commercially available in several different configurations as described in greater detail below. Slow rotating turbo nozzles, which are not commercially available, can also be specified wherein the speed of rotation is generally 600–1400 rpm. With either the fast or slow rotating turbo variant, the single stream fluid jets emanating from the nozzles appear to form a circular impact ring on the surface of the vehicle as illustrated in FIGS. 16 and 18. The diameter of the impact rings is dependent on the angle at which the fluid jet leaves the nozzle as well as the distance of the nozzle from the surface of the vehicle. Although the impact rings shown in dotted lines in FIG. 16 are tangential to each other, it is appreciated that depending on the cleaning application, the nozzles specified, and the distance from the cleaning surface, the impact rings may overlap or they may not touch at all. A variant of the turbo nozzle, the oscillating nozzle may also be utilized on the reciprocating wands. As the name suggests oscillating nozzles tend to oscillate back and forth in a generally linear path.

A reciprocating wand assembly of the type described above is also shown in U.S. patent application Ser. No. 09/698,845 which is of common ownership with the present invention and which is hereby incorporated by reference.

Figure 27:
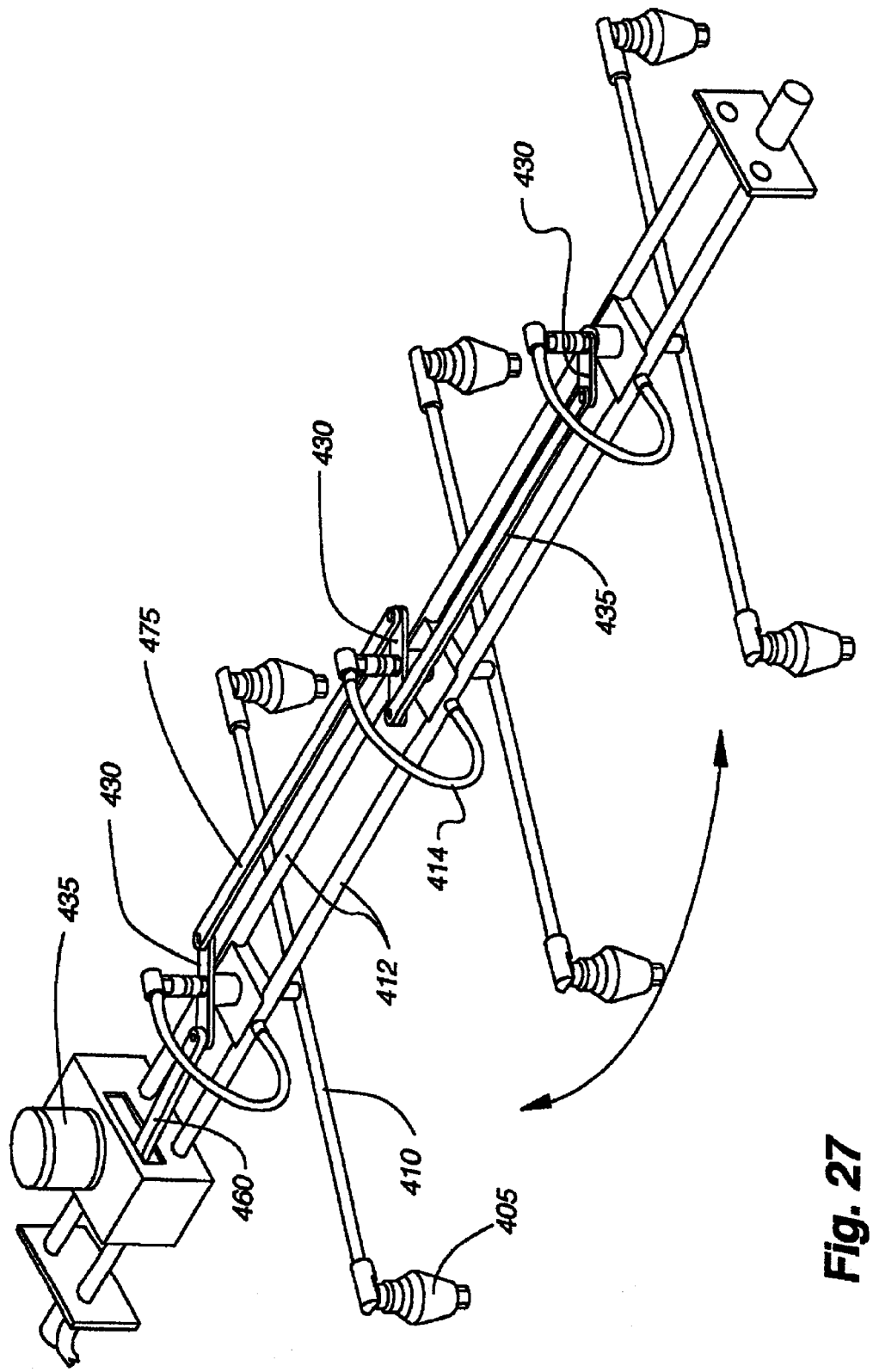
FIG. 27 is a fragmentary isometric of a portion of a variation of the first alternative moveable platform that utilizes reciprocating wand attached to a twin tube boom.
Figure 28:
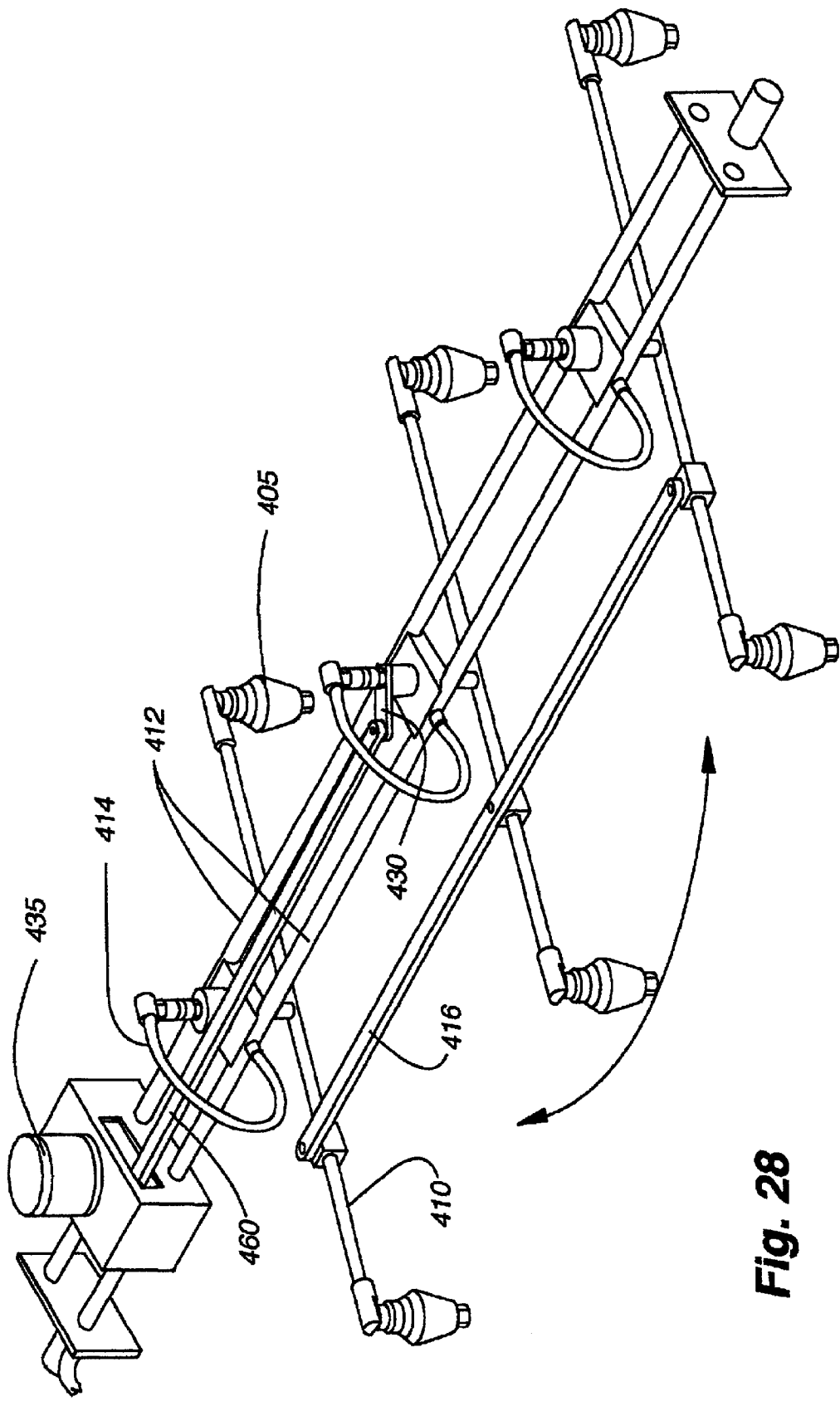
FIG. 28 is a fragmentary isometric of a portion of another variation of the first alternative moveable platform that utilizes reciprocating wand attached to a twin tube boom.

In a one variation on the first alternative embodiment, the reciprocating wand assembly 400 may be connected with a boom comprising twin boom tubes 412 as illustrated in FIG. 27. The cleaning solution is delivered to each of the wands 410 from one of the twin boom tubes 412 by a hose 414, as shown. The operation of the wand assembly 400 is substantially the same as described above. Another twin boom variation is illustrated in FIG. 28, wherein each of the wands 410 is pivotally connected to a transfer arm 416 that transfers the pivotal motion applied to the first wand by the motor 435 to the other two wands.

A Second Alternative Embodiment

FIGS. 29–32 illustrate a second alternative embodiment, wherein oscillating or turbo nozzles 705 are attached directly to parallel and spaced boom tubes 710. The cleaning action of the turbo and/or oscillating nozzles 705 ensures complete coverage of the underlying vehicle surface without the utilization of rotating or pivoting wand assemblies. As shown, the boom tubes 710 also double as fluid delivery conduits to carry the high pressure cleaning fluid to the nozzles 705. Preferably, cleaning solution can be routed to either one of the tubes 710 independently of the other, whereby one bank of nozzles attached to one tube can be turned off while the bank of nozzles are turned on. The nozzles may be orientated in a variety of angles relative to the boom tubes 710 depending on the spray pattern of the chosen nozzles. Typically, the boom tubes 710 will be spaced apart from each other a distance of around 18 inches, which has found to be effective in helping ensure complete coverage of the front and rear of a vehicle when the moveable platform is in its lowered position and the boom is tilted. As illustrated, the twin boom tubes 710 are attached to end brackets 715 which are connected to shafts 720 on either end for rotatably attaching the assembly to the gantry for pivotal movement relative thereto. It is appreciated that numerous other pivot boom configurations can be specified in addition to the embodiments and variations described herein as would be obvious to one of ordinary skill with the benefit of this disclosure.

A Third Alternative Embodiment

A third alternative embodiment is illustrated in FIGS. 19 and 20, wherein the tilt of the pivoting boom 245 is directly dependent on the vertical position of the moveable platform 240. Although this system does not offer the same degree of customizability for vehicles of differing profiles, it less complicated than the preferred embodiment and potentially much less expensive to produce as well. In the third alternative embodiment, a follower arm 505 is keyed to the pivoting boom 245. The follower arm 505 is typically an elongated member that is vertically orientated along its length. The follower arm 505 is attached at an upper end to the pivoting boom 245. The follower arm 505 rides between two opposing guides surfaces 515 formed by framework 510 within the left leg 205 of the gantry structure 105. Near the top of the left leg 205 the wand assemblies 250 are preferably orientated parallel to the ground. Accordingly, the opposing guide surfaces 515 are vertically disposed and spaced from each other a distance only slightly greater than the width of the follower arm 505. At a predetermined vertical location below the top of the left leg 205, the two opposing surfaces 515 diverge from each other at an acute angle, wherein the opposing guide surfaces 515 viewed together have an inverted Y-shape.

In operation, a biasing force is applied to the pivoting boom 245 to encourage it to rotate clockwise or counter-clockwise depending on the location of the gantry 105 relative to the front or rear of a vehicle. It is appreciated that any suitable biasing means may be utilized, including a less sophisticated pneumatic actuator that merely applies a rotational bias to the pivoting boom 245 but is not able to pivot to and hold the pivoting boom 245 at discrete angular orientations. Next, the moveable platform 240 is lowered as described supra. As the follower arm 505 enters the divergent portion of the guide surfaces 515, the pivoting boom 245 rotates in the biased direction until the lower portion of the arm 505 is in contact with the appropriate guide surface 515. As the pivoting boom 245 is lowered further, it pivots further as controlled by the distance between the center axis of the pivoting boom 245 and the appropriate guide surface 515 relative to the length of the follower arm 505. A maximum possible pivoting movement in either direction of 90 degrees is achieved when the distance between the pivoting boom's axis and the appropriate guide surface 515 is equal to the distance between the center axis and the distal end of the follower arm 505. Based on the operation of this tilting system, it can be appreciated that sensors and a means for measuring and interpreting the sensors concerning the pivotal position of the pivoting boom 245 are not required.

As discussed supra, the embodiments and alternative embodiments described herein are merely illustrative. A number of other alternative embodiments keeping within the scope of the invention as expressed in the appended claims have been contemplated. For instance, either or both the pneumatic reciprocating rotary actuator and the pneumatic lift could be replaced with mechanical versions. Furthermore, the placement of the various elements of the washing system relative to each other could be varied. For example, rather than having both the pneumatic lift and the reciprocating pivotal actuator located in the right leg, either could be located in the left leg. Additionally, many different types of nozzles may be utilized in the moveable platform based on considerations of cleaning effectiveness and cost.

A Four Pass Wash

Figure 33:
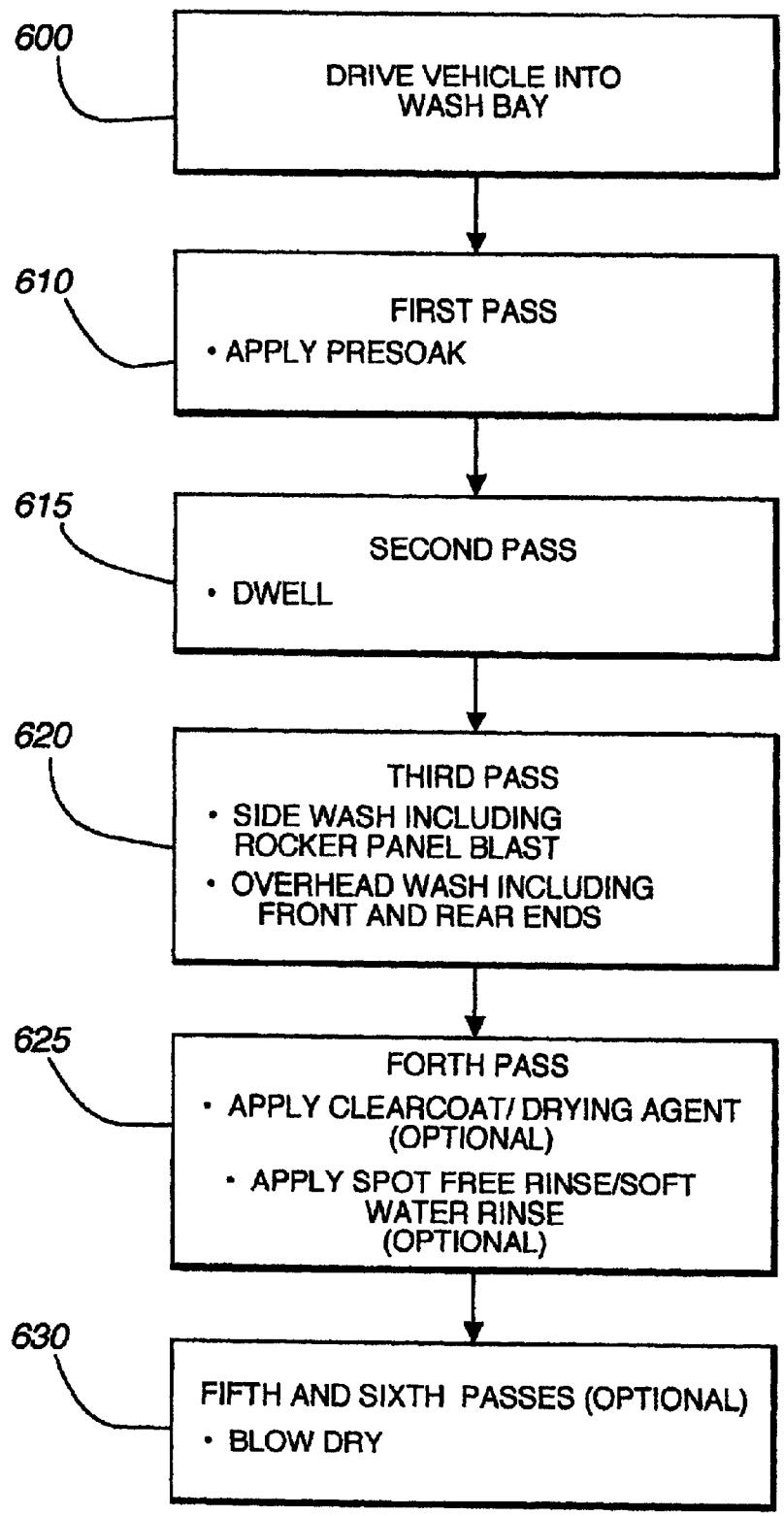
FIG. 33 is a flow diagram illustrating the operations performed during a four pass vehicle wash cycle.

Given the construction of the various embodiments of the vehicle wash system combined with a suitable control system, such as the one described in U.S. Pat. No. 6,277,207 which is commonly owned by the assignee of this application and is hereby incorporated by reference, a vehicle can be economically and effectively cleaned in four passes including the application of both a clear coat and a spot free rinse solution. This compares to six passes that are typically required during a wash cycle to similarly clean a vehicle using prior art vehicle wash systems. FIG. 33 is a flow chart illustrating the operations performed in each pass of a four pass wash cycle according to one embodiment of the present invention.

First, the vehicle is driven into the car wash bay as indicated by box 605. During a first pass 610, the gantry moves along and over the vehicle at a first speed (1 foot per second in one preferred embodiment), typically from the front of the vehicle to the back, spraying the vehicle with a presoak solution from the presoak nozzles 242. Also during the first pass, the length of the vehicle is determined and relative height of the vehicle is profiled for reasons that will become apparent below.

During a second pass 615, the gantry travels back beyond the front of the vehicle at a second speed. During the time it takes for the gantry to travel from the back to front, the presoak solution has time to penetrate and loosen any dirt on the vehicle's surface. It can be appreciated that the second speed of the gantry 205 can be set via the microprocessor controller at different rates depending on various factors including, but not limited to, the time of year (longer soaks may be used in the winter when more dirt and salt is likely to be on the vehicle), and the premium level of the wash (economy washes may have shorter soaks than "the works" washes).

During the third pass 620 water under high pressure is sprayed from the both the side and top high pressure nozzles 230 and 256. As described above, the side nozzles 230 can comprise a lower set of rocker panel nozzles 230A, a set of middle turbo nozzles 230B and a set of upper turbo nozzles 230C. As the gantry passes over the hood of a typical vehicle, both the middle set of nozzles 230B and the rocker panel blasters 230A are activated, and depending on the height of the hood and trunk, the upper set of nozzles 230C may not be activated. If the vehicle has a low hood/trunk height, the solenoid valve connected to the upper set of nozzles will close to prevent cleaning solution from needlessly being sprayed over the top of the hood and trunk. On the other hand, if the hood and/or trunk has a high profile then the upper nozzles 230C will be activated as the clearance eye sensor 232 located on one of the gantry legs senses the increased height of the vehicle. As the gantry passes over the middle portion of the vehicle, the rocker panel, middle and upper nozzles are all typically activated. Next, as the gantry passes over the back of the vehicle the upper set of nozzles 230C may be deactivated if the vehicle has a low trunk as typically would be the case with a sedan.

Before the Gantry passes over the vehicle during the third pass, the moveable platform 240 is lowered until it is in front of the front of the vehicle and the pivoting boom 245 is rotated until the upper nozzles 256 face the front of the vehicle. The nozzles 256 are activated and the front of the vehicle is impacted by jets of fluid as the platform 240 is raised. Once the platform 240 has been raised above the height of the front end, the pivoting boom 245 is rotated back to its unpivoted centered position with the nozzles 256 facing downwardly. Next, the gantry during the third pass passes over the hood of the vehicle with the nozzles 256 spraying jets of water downwardly. Depending on the height of the hood the movable platform 240 may be held in a position below the retracted position such that the distance between the hood and the nozzles 256 is reduced. As the gantry passes over the windshield, the moveable platform 240 rises to clear the roof and/or maintain a preferred distance between the nozzles 256 and the top surface of the vehicle. Depending on the height of the rear portion of the vehicle, the platform 240 may again be lowered to maintain a preferred distance between the surface of the rear deck and the nozzles 256. Finally, the gantry moves behind the vehicle and the moveable platform 240 is lowered until it is located behind the back of the vehicle. Simultaneously, the pivoting boom 245 is rotated so that the nozzles 256 face the front of the vehicle. Once the backside of the vehicle has been washed, the boom 245 rotates back to its neutral position and the moveable platform 240 ascends to its retracted position.

The speed at which the gantry 205 passes over the vehicle 120 during the third pass (0.57 feet/second in one preferred embodiment) is typically slower than the speed of the first pass. Further, different gantry speeds may be specified for a plurality of zones of the vehicle. The zones are determined as the vehicle is profiled during the first pass and typically include (i) the length of the vehicle that corresponds to the hood, (ii) the length of the vehicle that corresponds to the cab, and (iii) the length of the vehicle that corresponds to the trunk. It is appreciated that high profile vehicles, such as SUV's and vans may not include all of the three typical zones depending on their configurations. Varying the speed of the gantry based on the various zones of a vehicle is discussed in greater detail below in the section entitled "Speed Profiling."

During the forth pass 625 at a fourth speed (1.5 feet/second in one preferred embodiment), the gantry is moved from the back of the vehicle towards its initial position in front of the vehicle. Both a clear coat and a spot free rinse are applied in the manner described previously. Fifth and/or sixth optional passes at a fifth speed (0.33 feet/second in one preferred embodiment) may be included wherein a dryer apparatus 220 mounted on the gantry dries the vehicle. Alternatively, stationary blowers may dry the vehicle as it passes out of the wash bay. It is also appreciated that a three cycle wash may also be run in which the forth pass is not utilized.

It is appreciated that any number of sensor arrays maybe utilized to determine the profile of the vehicle being washed. The preferred embodiment, however, utilizes a clearance eye sensor 232 and front and rear locator sensors 233 and 234, as illustrated in FIG. 2. The clearance sensor eye 232 is located on one of the legs of the gantry in a vertical position below the lowest overhead deployed position of the moveable platform 240. Typically, the clearance sensor 232 will be positioned approximately 40 to 46 inches off the floor of the vehicle wash bay. If the "beam" of the sensor 232 is broken, it indicates a portion of a vehicle with a height above the height of the clearance sensor, and the upper set of side nozzles 230C are typically activated by the control system. If the beam is intact, a lower portion of the vehicle is indicated, causing the control system to lower the moveable platform 240 and to deactivate the upper set of side nozzles 230C.

The front and rear sensors 233 and 234 indicate whether the gantry is in front of or behind the vehicle. Typically, these sensors are located closer to the floor on one of the gantry legs, the front sensor 233 proximate the front face of the gantry, and the rear sensor 234 proximate the rear face of the gantry. An unobstructed sensor "beam" indicates that the gantry is either in front of or behind the vehicle. Typically, when both beams become unobstructed the control system recognizes the gantry is either in front of or behind the vehicle and it then travels an additional predetermined distance in its direction of travel to ensure it is behind or in front of the vehicle enough to allow operation of the moveable platform 240 and pivot boom 245 to clean the respective front or rear end of the vehicle.

Pressure Profiling

By selectively turning the various sets of nozzles of the vehicle wash system off and on depending on the position of the gantry 205 relative to the vehicle 120, the pressure of the cleaning solution exiting the active nozzles can be varied to maximize the vehicle wash system's cleaning effectiveness. During the wash cycle, while the moveable platform 240 is lowered so that the boom nozzles 256 face the front surfaces of a vehicle, the gantry side nozzles 230 are deactivated so that the pressurized cleaning solution is sent only to the boom nozzles 256 at the highest possible pressure. In one embodiment, the pressure of the cleaning solution supplied to the boom nozzles ranges from 1100 to 1300 pounds per square inch (psi) with 1100 psi being typical. The high pressure helps facilitate the effective cleaning of the typically hard to clean front end of a vehicle. It is appreciated the side nozzles 230 may also be deactivated when the platform is lowered to clean the rear end of a vehicle.

As the boom is retracted and the gantry moves over the hood, the lower side nozzles 230A and B are activated which causes the pressure to drop to a second intermediate level (900–1100 psi in one embodiment with 1000 psi being typical). Cleaning solution exiting the active nozzles at this intermediate pressure is effective in cleaning the front fender surfaces that are often dirtier than other parts of a vehicle due to the fenders proximity to the wheels and splash back often caused by driving through puddles. Further, the distance between the bottom of the boom nozzles 256 and the surface of the hood (or trunk) is often greater than the distance between the boom nozzles and the top surface of the cab, accordingly, the higher pressure cleaning solution is desirable when the boom nozzles are over the hood and trunk.

Finally, over the center portion of the vehicle, typically corresponding to the vehicle's cab, the upper side nozzles 230C are activated and are utilized in conjunction with the lower side nozzles 230A and B and the boom nozzles 256. As a result, the pressure of the cleaning fluid exiting the nozzles drops to a third level that is lower than the first and second levels (less than 900 psi in one embodiment with 800 psi being typical). Since the top surface of a vehicle and the side surfaces proximate the cab do not typically get as dirty as the front surfaces and the fender surfaces, the lower pressure cleaning solution is effective in cleaning the vehicle in these areas.

Speed Profiling

Speed profiling is a process by which the controller of the vehicle wash system adjusts the speed at which the fluid nozzles are moved along the vehicle relative to the vehicle depending on the profile of the vehicle. As described above, the nozzles are typically attached to a moveable gantry in the preferred embodiments, although the nozzles may be attached to any suitable type of framework in alternative types of vehicle washes. In a manner similar to that described above, one or more sensors are utilized to determine the profile of the vehicle. An exemplary method of speed profiling is described herein for a gantry-type wash system during the wash pass(es) (described above as the third pass). It is to be appreciated that the speed at which the various nozzles move relative to the vehicle during a pass may be varied in other passes as well, such as the presoak pass, the clear coat application or spot free rinse passes. Further, the speed at which a drying blower passes over a vehicle may also be varied depending on the profile of the vehicle that is being dried.

Figure 45:
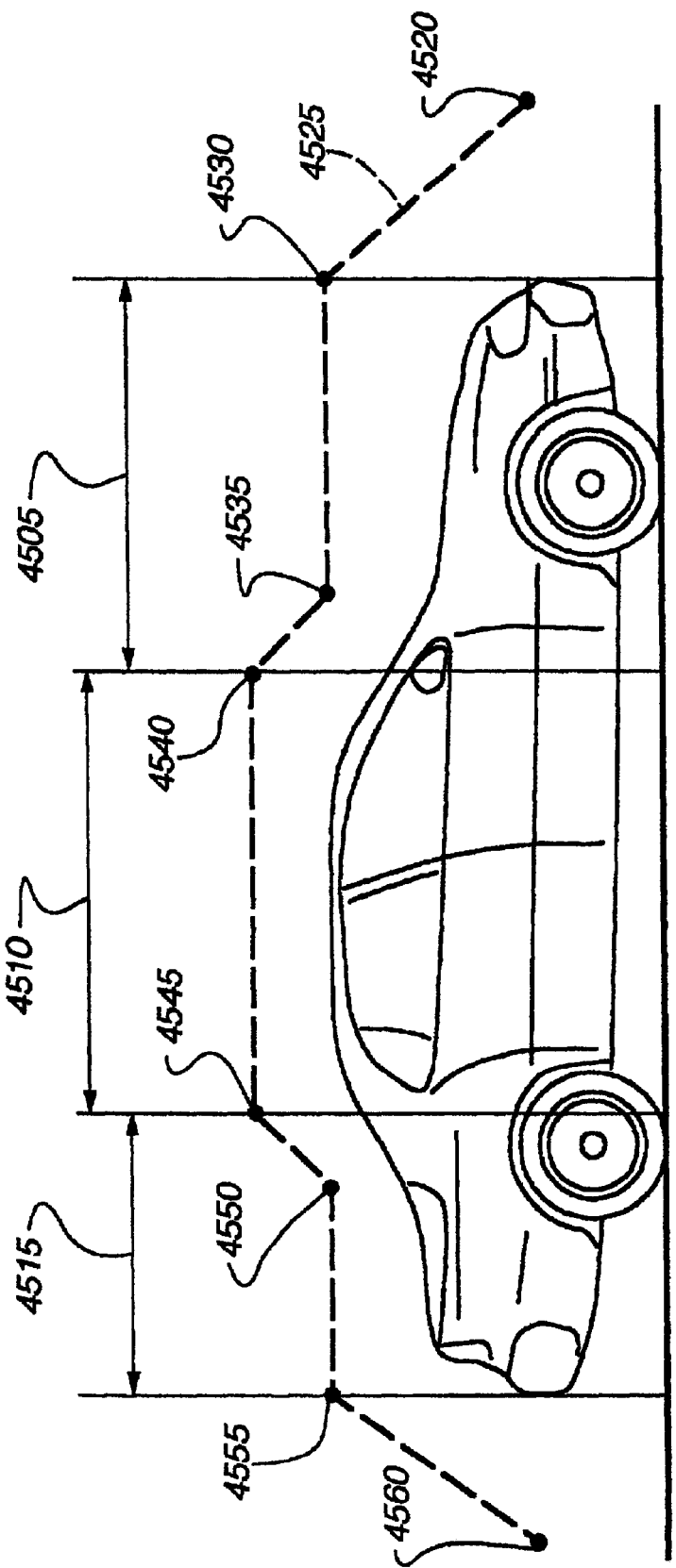
FIG. 45 is a side view of a vehicle segmented into three zones illustrating the path of the overhead nozzles during a wash cycle.

As illustrated in FIG. 45, the profile of the vehicle is divided is typically divided into three zones: a hood zone 4505; a cab zone 4510; and a trunk zone 4515. The hood zone 4505 comprises the front portion of a vehicle that is typically less than 42" above the floor of the vehicle wash's bay. The cab zone 4510 comprises the portion of the vehicle that has a height in excess of 42" and the trunk zone 4515 comprises the rear portion of the vehicle that has a height of less than 42". It is appreciated that certain vehicles depending on their profile may only have one or two zones or more than three zones. For example, the height of a van may be in excess of 42" along substantially its entire length so it would only have a cab zone. An SUV would generally have a hood zone and a cab zone, but no trunk zone. It is further appreciated that a different zone dividing height other than 42" may be utilized in alternative embodiments.

Through the controller, the speed of the gantry 205 relative to a vehicle 120 can be set independently to anyone of 10–15 available speeds (other numbers of available speeds may be specified in other embodiments). For example, the speed in the hood zone 4505 can be set relatively low to ensure that the hard to clean front of the vehicle and the fenders are blasted with a greater amount of cleaning solution. Conversely, the speed of the gantry 205 as it travels over the cab zone 4510 can be set at a higher speed since the cab zone of a vehicle is typically not as dirty as the hood zone. Additionally, the speed of the gantry may be set to an intermediate speed as it travels over the trunk zone of a vehicle. The operator may also program the controller to move the gantry at different speeds depending on the type of vehicle that is being washed or based on the premium level of the wash. For example, if a premium wash is chosen, the gantry may move at relatively slow speeds during the wash cycle when compared to the speeds utilized in an economy wash. It is to be appreciated that there are a large of number potential combinations of speeds that can be programmed by a vehicle wash operator to accommodate the operators desires regarding the quality and effectiveness of a wash compared with the cost and time necessary to perform an entire wash.

Figure 46:
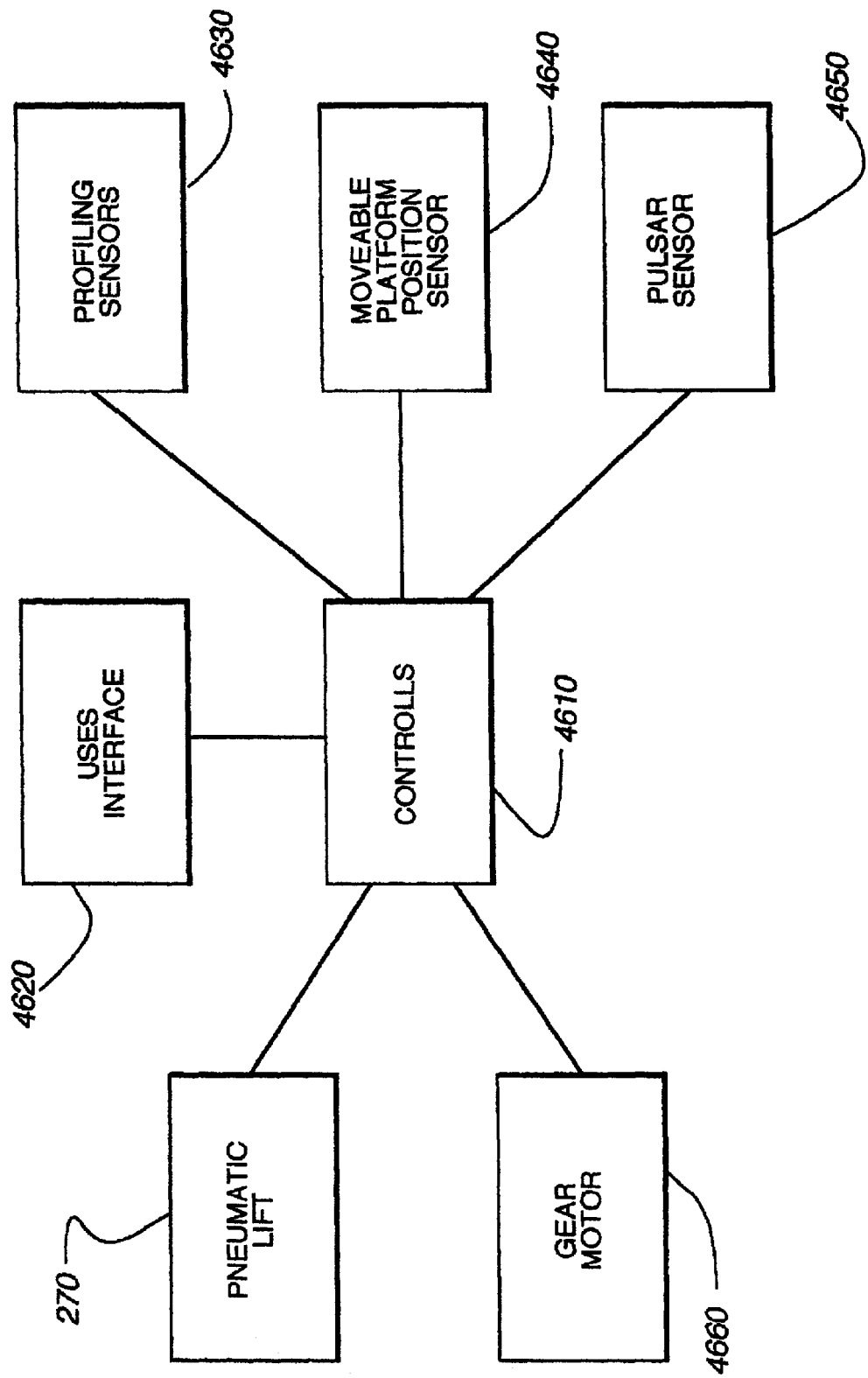
FIG. 46 is a block diagram of a vehicle washing system's controller interfaced with the vehicle washing system's sensors and drive mechanisms.

Because the moveable platform 240 lowers itself to a position in front of the vehicle, the vehicle wash system controller is adapted to monitor and control the movement of the platform 240 and/or the gantry 205 to ensure that the moveable platform does not come into contact with the vehicle during a wash operation. FIG. 46 is a block diagram illustrating how a computerized controller can be interfaced to ensure proper operation of the vehicle wash system. The controller 4610 is typically comprised of a microprocessor and associated computer readable memory for storing operator instructions and profile information for a vehicle being washed. The controller is coupled with a user interface 4620 through which an operator may program the various wash options including the gantry speeds to be utilized during the various passes of the gantry 205 during a wash. A second user interface (not shown) may also be provided through which the owner of a vehicle may deposit money and select a wash for his vehicle.

The controller 4610 is also coupled to a number of sensors including profiling sensors 4630, a moveable platform position sensor 4640 and a pulsar wheel sensor 4650. The profiling sensors 4630 determine the locations and positions of the various zones of the vehicle. The moveable platform position sensor 4640 determines the vertical position of the platform 240. In one embodiment, the platform position sensor 4640 measures the number of rotations of a pulley wheel over which the drive belt 285 passes to determine the position of the platform below its stowed location. The pulsar wheel sensor 4650 measures the number of rotations of the pulsar wheel. The pulsar wheel is coupled with a idler wheel that is in direct contact with one of the guide rails. The controller 4610 utilizes the signals from the pulsar wheel sensor to calculate the position of the gantry 205 relative to a reference position. It is appreciated that a wide variety of sensors and sensor types may be utilized to determine the positions of the gantry 205 and the moveable platform 240 as would be obvious to one of ordinary skill in the art. Finally, the controller 4610 is coupled with (i) the gear motor 4660 for moving the gantry 205 and (ii) the pneumatic lift 270 for vertically moving the platform 240.

Referring back to FIG. 45, the operation of the gantry 205 utilizing speed profiling will be described. First, the vehicle is profiled during the presoak or first pass from the front of the vehicle to the rear. The gantry then returns to a position in front of the vehicle after the soak (or second) pass. Next, the moveable platform 240 lowers itself and the boom 245 tilts inwardly so that the boom nozzles 256 face the front of the vehicle. In a preferred embodiment, the platform 240 is lowered 41" below its stowed position and is located 24" in front of the front end of the vehicle in a front high pressure position (FHPP) 4520. The nozzles 256 are activated and cleaning solution is sprayed onto the vehicle.

The gantry 205 begins to move rearwardly at the predetermined speed for the hood zone 4505 that has been set by the operator. As the gantry moves, the moveable platform 240 shown by the dotted line 4525 in FIG. 45, is raised vertically at a rate equal to the horizontal rate of movement of the gantry 205 providing the length of the hood zone 4505 is sufficient. Additionally, as the platform is raised, the boom 245 rotates back to its nominal position with the nozzles 256 pointed downwardly. In the preferred embodiment when cleaning a vehicle with a relatively long hood zone, the platform 240 is raised 31" to a front profiling start position (PSPF) 4530, wherein the platform 240 is deployed 11" below its stowed position.

From the PSPF 4530, the gantry 205 continues to move rearwardly at the predetermined speed with the platform 240 disposed a distance below the stowed position until the gantry 205 and the associated platform 240 reach front profiling end position (PEPF) 4535 which in the preferred embodiment is 6" from the rear end of the hood zone 4505. From the PEPF 4535 to rear end of the hood zone, the platform 240 is raised into its stowed position prior to entering the cab zone 4510, at location 4540.

During the ascent of the platform 240 and the rearward travel of the gantry 205 over the hood zone 4505, the relative positions of the gantry and the platform are continuously monitored by the controller 4610 through the appropriate sensors to ensure the platform is ascending at the proper rate. In certain circumstances it is possible that the platform 240 cannot ascend as fast as the gantry 205 is being moved rearwardly. For instance, the operational speed of the pneumatic lift 270 can vary with temperature. The pneumatic lift 270 may not be able to move the platform as 240 quickly when it is first used in the morning as when it has "warmed up." It can be appreciated that the platform could impact the hood of the vehicle if the platform 240 is not raised fast enough, especially if one of the higher speeds is specified for the gantry's rate of travel in the hood zone 4505. Accordingly, the controller 4610 will stop the gear motor 4660 if the ascension rate of the platform 240 falls below the travel rate of the gantry. The controller will not restart the gear motor 4660 until the platform 240 has caught up. Should the platform fall behind again, the controller will again stop the gear motor. In this manner, the platform will not be permitted to physically impact the hood of the vehicle. In a similar manner, the controller turns the gear motor off and on as the platform ascends between the PEPF 4535 and the rear end of the hood zone 4505.

With certain vehicles, the length of the hood zone 4505 is less than is necessary to permit the platform 240 to rise at a one to one relationship with the movement of the gantry 205. In such a situation, the controller 4610 sets the necessary rate of vertical ascension of the platform at a level that is greater than the speed of travel of the gantry. As described above, the controller will periodically stop the gear motor 4660 as necessary to maintain the proper ascension rate relative to gantry travel. On certain SUVs and vans that do not have hood zones, the platform 240 will usually descend in front of the vehicle in 3–4" increments to clean the front surfaces and then ascend back into the stowed position before the gantry begins moving rearwardly.

Next, the gantry travels rearwardly over the top of the vehicle's cab zone 4510 with the platform 240 in its fully stowed position at a predetermined speed for the cab zone that may be different from the predetermined speed for the hood zone 4505. Once the gantry 205 reaches the end of the cab zone at location 4545, the speed of the gantry's rearward movement changes to a predetermined speed selected for the trunk zone 4515 and the platform 240 begins to descend. Initially on a vehicle with a relatively long trunk zone as shown in FIG. 45, the platform 240 in the preferred embodiment descends 11" as it travels 6" rearwardly from the end of the cab zone 4545 to the rear profiling start position (PSPR) 4550. From the PSPR 4550, the gantry of the preferred embodiment continues to travel rearwardly at the trunk zone predetermined speed with the platform 240 deployed 11" below the stowed position until the gantry reaches the rear Profiling End Position (PEPR) 4555. From the PEPR 4555, the platform 240 begins its descent to its fully deployed position behind the rear end of the vehicle into the rear high pressure position (RHPP) 4560. The location of the PEPR 4555 is determined by the controller 2610 based on several factors including (i) the distance between the rear end of the vehicle and the RHPP 4560; (ii) the length of the trunk zone 4515, and (iii) the preferred one to one descent rate relative to the speed of the gantry. For example, with a vehicle having a long trunk whose rear end is 24" from the RHPP 4560, the PEPR 4555 would begin 7" from the rear end of the trunk zone 4515 thereby permitting the platform 240 to descend 31" as the gantry 205 travels 31". In vehicles with short trunk zones 4515, a greater rate of descent may be specified.

With vans, SUVs and other vehicles that do not have a trunk zone, the platform 240 will remain in its stowed position until the gantry 205 is located behind the vehicle and the platform can safely descend to the RHPP 4560. In a preferred embodiment, the platform descends slowly to the RHPP 4560 from the stowed position in discrete steps (typically 3–4"). As the boom is lowered, cleaning solution is sprayed onto the rear surface of the vehicle using the boom nozzles. In embodiments incorporating pressure profiling, cleaning solution can be sent to the boom nozzles alone at a high pressure level as the platform descends to maximize cleaning effectiveness. It is to be appreciate that a similar process can also be used to clean the front surface of vehicles that do not have a hood zone.

As described above concerning the hood zone 4505, the pneumatic lift 270 may not be capable of lowering the platform 240 fast enough to maintain the controller-specified descent rate based on the trunk zone predetermined speed of the gantry. Unlike with the ascent of the platform over the hood zone, there is no threat that the platform will impact the vehicle if it descends too slowly. Accordingly, the controller 2610 permits the gantry 205 to continue on its rearward travel unimpeded at the predetermined speed regardless of the location of the platform.

The various distances and dimensions specified herein relate to a preferred embodiment of the vehicle wash system and a wide variety of variations are anticipated that could be effectively utilized with speed profiling. Further, similar speed profiling operations may also be utilized in other passes during a vehicle wash, or when the gantry is moving from the rear of the vehicle to the front of the vehicle. In general, when the gantry is moving towards the cab zone 4510 (i.e. the zone where the vehicles height is greater than a specified height) the gear motor 4660, which is moving the gantry 205 at a pre-selected speed, will be deactivated by the controller if the platform 240 does not ascend at a controller determined rate to permit the platform to catch up. Conversely, when the gantry is moving away from the cab zone, the gantry will be permitted to move at the preselected speed regardless of the position of the platform.

The Dump Valve

After a wash cycle as described above, it is desirable to purge the cleaning solution from the boom nozzles 256, as well as, the hoses (and/or supply lines) that fluidly connect the nozzles to the source of the cleaning solution. If the nozzles and supply lines are not purged, cleaning solution (typically, soft water) left in the nozzles and supply lines may drip onto the vehicles surface during a spot free vehicle rinse and/or clear coat application. Drops of soft water, as opposed to the reverse osmosis water that is typically used in a spot free rinse solution, may leave unsightly white rings on the vehicle after drying.

In prior art vehicle wash systems, the cleaning solution is purged from the nozzles and supply hoses using pressurized air prior to beginning a rinse or clear coat application pass. However, the time necessary to blow out the nozzles can be prohibitive, especially if the nozzles have large bodies, such as slow rotating turbo and oscillating nozzles. Accordingly, a dump valve is attached inline with a supply hose to the boom nozzles at a location near the base of the gantry. When the gantry has completed its wash pass, the dump valve is opened by the controller and the majority of the cleaning solution in the supply hoses and boom nozzles is siphoned onto the floor of the vehicle wash bay. Subsequently a relatively short blast of pressurized air through the supply hoses and the nozzles can effectively purge any remaining cleaning solution.

Turbo and Oscillating Nozzles

As described above various types of high pressure nozzles are utilized in the various embodiments of the present invention, including zero degree nozzles, fast rotating turbo nozzles, slow rotating turbo nozzles, and oscillating nozzles. Zero degree nozzles are well known in the art and are commercially available from a variety of vendors. Typically, zero degree nozzles shoot a single jet of fluid from a fixed orifice, such that each they impact on a relatively small area on the surface of a vehicle when used in conjunction with a vehicle wash system. Accordingly, they are typically utilized with rotating wands that move the nozzles over the surface of the vehicle to obtain complete coverage of the associated surface, such as the rotating wand assemblies described concerning the first embodiment. Given the high integrity of the fluid jets that emanate from Zero degree nozzles, they typically have a maximum effective range of up to 80 inches.

As illustrated in FIG. 34, both the fast and slow rotating turbo nozzles comprise a rotating nozzle member 805 that has an orifice 810 that rotates within the body 815 of the nozzle causing the fluid jet emanating therefrom to assume a spiral shape as illustrated in FIG. 16. This causes a single turbo nozzle to have a circular impact area, which makes obtaining complete coverage of the vehicle surfaces simpler. For instance, in certain circumstances, the use of fast rotating turbo nozzles 405 with the reciprocating wand assemblies 400 of the second alternative embodiment result in better coverage of the vehicle surfaces and more effective cleaning of the surfaces than the zero degree nozzles used with the rotating wands of the first embodiment. Furthermore, by substituting fast rotating turbo nozzles for the zero degree nozzles in the rotating wands of the first embodiment, multiple impacts of the stream with the automobile surfaces results for improved cleaning performance. The versatility of the fast rotating turbo nozzle is also demonstrated by the second alternative embodiment where the use of reciprocating wands are eliminated, since turbo nozzles with spray patterns that overlap at least partially can effectively clean the entire top surface of a vehicle when combined with the movement of the gantry over the vehicle. It is also noted that the series of turbo nozzles located on either leg of the gantry effectively replace side wand assemblies utilizing zero degree nozzles without a reduction in cleaning effectiveness. Another advantage of turbo nozzles generally is there ability to operate effectively at lower pressures than the typical zero degree nozzle. Whereas, zero degree nozzles generally require pressures of around 900 psi or greater, typical turbo nozzles can operate at pressures of as low as 600 psi.

Fast rotating turbo nozzles, in which the nozzle orifice rotates at speeds of round 1600 to 2000 rpm, are commercially available in a variety of sizes from several vendors and have been utilized in various applications on vehicle wash systems. However, fast rotating turbo nozzles suffer from a drawback that has limited their application in certain vehicle wash system applications, namely, they have a limited effective range of 28" to 36" depending on the size of the fast rotating nozzle specified. At distances in excess of the effective range, the spiraling fluid jet looses its integrity and becomes a mist, which although increasing the coverage of the underlying surface, does not impart enough of an impact force on the vehicle to effectively dislodge dirt and debris. It can be appreciated that the total distance traveled by any portion of cleaning solution in a spiraling fluid jet as it spirals towards a vehicle's surface is much greater than the distance between the nozzle orifice and the surface to be cleaned. In other words, the length of an uncoiled spiraling jet would be much greater than the distance between the nozzle tip and the surface of the vehicle. It follows, therefore, that the aerodynamic drag incident on a spiraling fluid jet from mist and air would be significantly greater than on a comparable straight fluid jet (such as from a zero degree nozzle). This aerodynamic drag tends to dissipate some of the spiraling jets energy. Furthermore, the complex force vectors acting on the spiraling fluid jet as it leaves the nozzle and travel towards the vehicle surfaces tends to compromise the integrity of the spiraling jet contributing to its effective disintegration at much short distances than a comparable straight fluid jet.

Slow rotating turbo nozzles of the present invention as their name would suggest rotate at greatly reduced rate of around 600–1400 rpm when compared to their fast rotating cousins. The fluid jets emanating from them spiral at a significantly slower rate than their fast rotating cousins, making less turns before reaching the surface of the vehicle. The distance traveled by any portion of the fluid jet from a slow rotating turbo nozzle would be less than that of a jet from a fast rotating nozzle situated a similar distance from a vehicle surface. The fluid jet of a slow rotating turbo nozzle would, therefore, encounter less energy dissipating aerodynamic drag than its fast rotating cousin and the energy of the fluid jet from the slow rotating turbo nozzle would dissipate less than the fluid jet from the fast rotating turbo nozzle. Accordingly, a slow rotating turbo nozzle has a greater effective range (similarly sized fast and slow rotating turbo nozzles have approximate ranges of 36" and 42" respectively). Even at distances within the effective ranges of the fast rotating turbo nozzle, the slow rotating turbo nozzles delivers a fluid jet having a greater impact force per unit area than the comparable fast rotating turbo nozzle. By using slow rotating turbo nozzles in a vehicle wash system, all surfaces of the vehicle can be hit with jets of cleaning solution at effective levels of impact force to dislodge most dirt and debris, especially those on contoured surfaces of a vehicle that might be outside of the range of fast rotating turbo nozzles.

Figure 41:
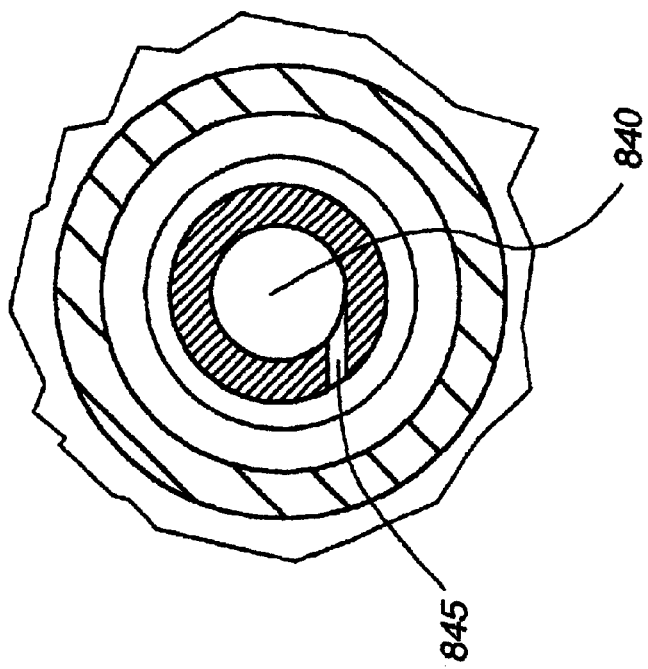
FIG. 41 is a partial section of a prior art fast rotating turbo nozzle taken along lines 36–36 of FIG. 34 having a single inlet orifice into the nozzle body.

FIGS. 34–40 and FIG. 42 illustrate a slow rotating turbo nozzle. Furthermore, FIG. 41 illustrates a cross section of a fast rotating turbo nozzle for purposes of comparison. Unless otherwise indicated, the description proved herein generally applies to both fast and slow rotating turbo nozzles. Distinctions between the fast and slow turbo nozzles will be specifically indicated.

As shown in FIG. 34, A typical turbo nozzle comprises three basic components: a nozzle body 815; an inlet cap 820 that is threadably received into the top of the body; and a rotating nozzle member 805 that is contained within the body. The hollow nozzle body 815 has a generally conical shape beginning with a threaded opening to receive the inlet cap 820 at a distal end. From the distal end, the walls of the body 815 taper until terminating at the proximal end in a ceramic seat 825. The ceramic seat 825 has a concave inside surface configured to receive the orifice of the rotating nozzle member and a passage 830 therethrough to permit the fluid jet emanating from the orifice to exit the turbo nozzle.

The inlet cap 820 is a generally cylindrical member having a partially threaded outside surface for being received into the threaded opening of the nozzle body 815 with an o-ring seal 835 disposed thereon. The inlet cap 820 further comprises a vertical bore 840 that is partially threaded for coupling with a cleaning solution supply manifold or hose. The bore is closed at its bottom end; however, one or more small jet passageways 845 extend through the vertical wall of the bore 840 at generally acute angles and into the interior of the nozzle body 815 as illustrated in FIG. 37. The angles that the one or more passageways 845 extend through the wall, the diameter of the passageways and the interaction between the fluid jets emanating therefrom during operation are all critical in determining the rotational speed of the turbo nozzle as will be described below. Lastly, A small nib 850 extends from the center of the outside surface of the closed bottom end of the inlet cap 820 for reasons that will become apparent.

The rotating nozzle member 805 is illustrated in isolation in FIGS. 35 and 36. The rotating nozzle member 805 typically comprises a brass tube 855 having a perforated support piece 860 spanning the interior of the tube proximate its distal end to provide support and additional strength thereto. The distal end of the tube is capped with a ceramic orifice 810 from which the spiraling jet of the turbo nozzle emanates. The ceramic orifice 810 has a generally conical shape that terminates in a rounded end. The rounded end is sized to nest in the concave portion of the ceramic seat 825 such that when under pressure the ceramic orifice 810 effectively seals the passage through the ceramic seat 825. The diameter of the ceramic orifice 810 ultimately controls the volumetric output of the nozzle.

The outside surface of the brass tube 855 is covered by one or more plastic shrouds 865, 870 and 875. In general, the plastic shrouds serve to protect the brass tube 855 as the nozzle member 805 is rotated within the nozzle body 815 at high speeds. Depending on the particular configuration of the turbo nozzle, a single unitary plastic shroud maybe utilized, although as illustrated, three separate and distinct shrouds 865, 870 and 875 are indicated. The upper shroud 865 serves to guide the nozzle member 805 around the nib 850, as best illustrated in FIGS. 34 and 38. The middle shroud 870, which is shown having a hexagonal outer surface, serves to guide the nozzle member 805 along the inside surface of the nozzle body 815 as best illustrated in FIG. 39. Because the middle shroud 370 is hexagonal, it will cause the orifice 810 to rotate in a more hexagonal pattern, thereby altering the characteristics of the fluid jet emanating therefrom. Furthermore, the hexagonal surface of the middle shroud 870 will not rotate as easily around the inside surface of the nozzle body 815, thereby increasing the rotational friction of the nozzle member 805, slowing its effective rate of rotation even further. As illustrated in FIG. 40, the hexagonal shroud 370 can be replaced with a circular shroud 870A in variations thereof.

The operation of a typical turbo jet will now be described. First, the cleaning solution enters the inlet cap 820 from a source under high pressure. The cleaning solution then travels through the one or more passageways 845, wherein the cleaning solution is accelerated and is propelled from the nozzles as a stream in a direction generally perpendicular with the center axis of the turbo nozzle towards the corresponding inner surface of the body 815. The stream impacts inner surface of the body 815 at an acute angle, which induces the cleaning solution to rotate in a clockwise direction. A clockwise vortex of cleaning fluid is created within the body 815 which is completely filled with the pressurized cleaning solution during operation. By reversing the angle of incidence between the stream and the wall of the body, a counterclockwise vortex could be created as well. The vortex causes the nozzle member 805, which is in its path, to rotate at essentially the same velocity as the vortex. It is appreciated that the nib 850 prevents the nozzle member 805 from positioning itself in the calm center of the vortex. Next, the pressurized cleaning fluid contained in the body is forced into the top end of nozzle tube 855 and through the orifice 810, wherein the cleaning solution is accelerated and exits the nozzle in the form of a spiraling fluid jet.

Figure 42:
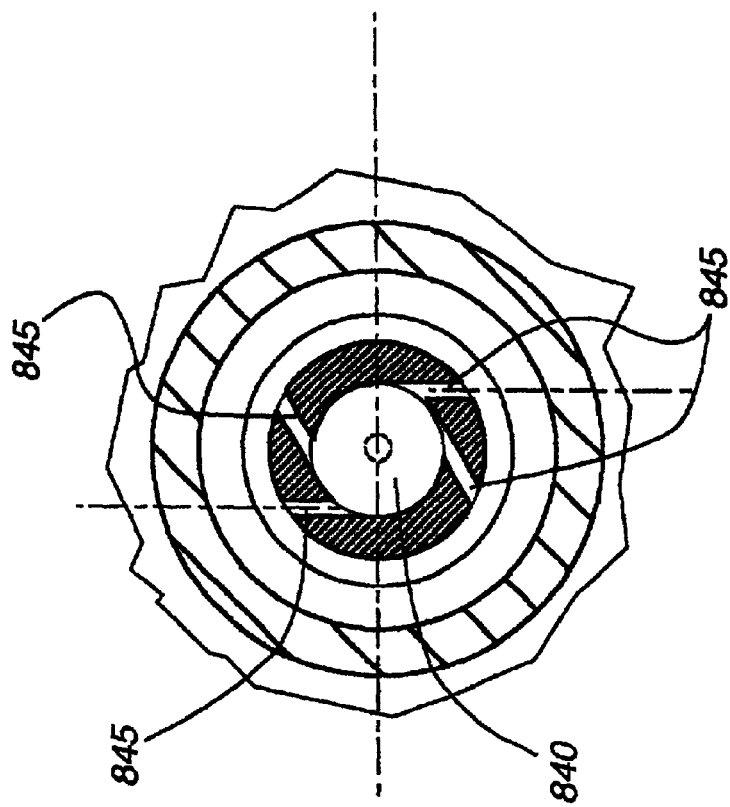
FIG. 42 is a partial section of a slow rotating turbo nozzle taken along lines 36—36 of FIG. 34 having four inlet orifices into the nozzle body.

The speed of rotation of the nozzle and the speed of rotation of the fluid jet emanating therefrom is directly related to the rotational velocity of the vortex created within the nozzle body 815. The velocity of the vortex is dependent on both the angle at which the fluid streams emanating from the inlet cap passageways 845 are incident on the inner surface of the body wall, as well as, the velocity of the streams. A horizontal cross section of a typical fast rotating turbo nozzle showing a single passageway 845 through the bore 840 in the inlet cap 820 into the body of the nozzle is illustrated in FIG. 41. A corresponding section of a slow rotating turbo nozzle is illustrated in FIG. 42, wherein four passageways 845 are shown. The four passageways 845 have a combined cross sectional area greater than that of the single passageway 845 of fast rotating turbo nozzle of FIG. 41. For a given pressure of fluid being passed through the passageways of both nozzles, the fluid stream emanating from the passageway of the fast rotating nozzle will be faster than the streams emanating from each of the passageways of the slow rotating turbo nozzle. Accordingly, the rotational speed of the vortex created in the slow rotator will be less than the speed of the vortex in the fast rotator, resulting in a slower rotating nozzle member.

Other means of creating a slow rotating turbo nozzle are also contemplated. For instance, a set of one or more passageways 845 could pass through the inlet cap 820 at one angle while a second set of one or more passageways could pass through the inlet cap at a second angle, such that the streams emanating from the second set interfere with the vortex caused by the streams from the first set such that the speed of the vortex is reduced. For instance, streams from the first set of passageways 845 may induce a clockwise rotating vortex in the nozzle body 815 having a speed comparable to that of a vortex in a fast rotating turbo nozzle. The streams from the second set of passageways may exit the passageways at angles that would by themselves induce a counterclockwise rotation. The combination of these two sets of streams effectively results in a vortex of a reduced speed. It is to be appreciated that a wide variety of combinations of sets of passageways can be utilized to tailor the speed of the vortex and consequently the rotational speed of the turbo nozzle to a desired level.

Figures 43, 44:
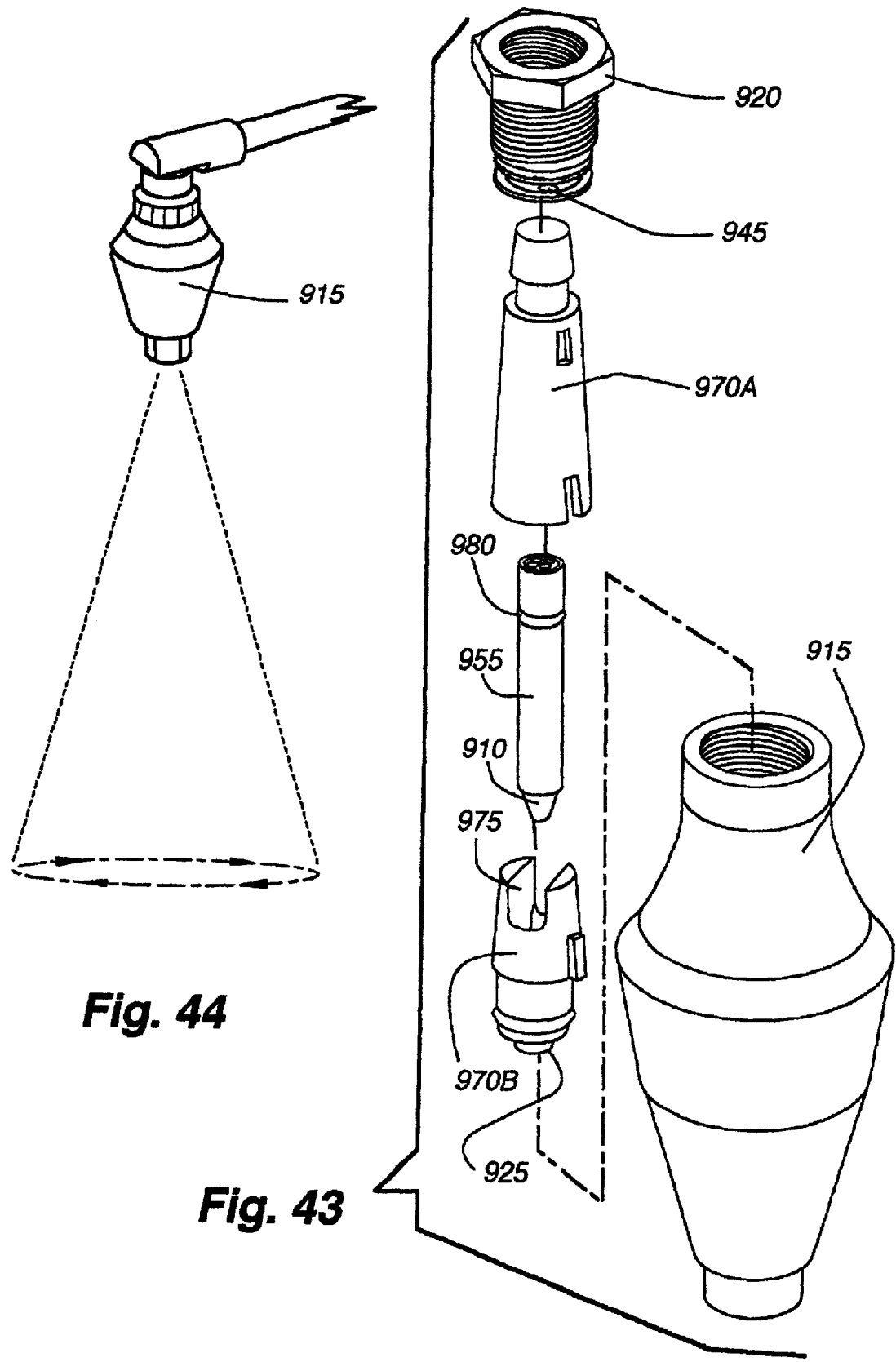
FIG. 43 is a exploded isometric view of an oscillating nozzle.
FIG. 44 is a fragmentary isometric of an oscillating nozzle showing atypical spray pattern of an oscillating nozzle.

Another type of nozzle used in embodiments of the present invention is an oscillating nozzle as shown in FIG. 43. The fluid jet emanating from the oscillating nozzle differs from the fluid jet of turbo nozzle in that instead of spiraling, it moves back and forth in a generally linear path as illustrated in FIG. 43. Oscillating nozzles with small nozzle bodies 915 are commercially available, which oscillate at a relatively fast rate; whereas, slower oscillating nozzles having large bodies 915 are not commercially available, although both designs operate in a similar manner as described herein. The oscillating nozzle has an inlet cap 920 and body 915 generally very similar to those on a turbo nozzle except the ceramic seat 925 is not fixed to the body 915, rather it is fixed to the lower portion 970B of a housing 970 contained within the body 915. The tube 955 to which the orifice 910 is affixed is does not spin, nor does it rotate about a nib (not shown) on the inlet cap 920. Rather, it is permitted only to pivot side within a slot 975 in the lower portion 970B of the nozzle member housing 970. The lower portion 970B of the nozzle member housing 970 is fit into an opening in the base of the body 915 such that it cannot spin but it can pivot slightly. An upper portion 970A of the housing portion is connected to the lower portion 970B, thereby surrounding the nozzle tube. The attachment of the upper portion 970A with the lower portion 970B prevents it from spinning; however, it is free to rotate about the nib on the inlet cap 920 in a fluid vortex created in the body 915. Rotation of the upper portion 970A of the housing causes it to impact an o-ring 980 circumscribing the brass tube 955 proximate its top end causing the orifice 910 to pivot back and forth in the slot 975.

In general, the effective range (approximately 45") of the oscillating nozzles is greater than that of the turbo nozzles; however, the range of faster small body oscillators is less than that of a slower large body oscillator. It is to be appreciated that the speed of oscillation is directly related to the velocity of the vortex created in the nozzle body and the distance that the vortex must travel to complete a revolution of the inside of the body 915. It follows that the speed of oscillation may be reduced by (1) increasing the size of the nozzle body whereby the vortex has a greater distance to travel to complete a revolution, or the Accordingly and/or (2) using the same types of modifications to the inlet cap passageways 945 as described above for turbo nozzles to slow the velocity of the stream emanating from passageways 945.

Although the present invention has been described with a certain degree of particularity, it is understood that the present disclosure has been made by way of example, and changes in detail or structure may be made without departing from the spirit of the invention as defined in the appended claims. For instance, the various embodiments of the vehicle wash system described above are typically of the gantry-type. It is to be appreciated that given the benefit of this disclosure that many of the features of the car wash system may be utilized in conjunction with other styles of vehicle washes. For instance, features of this invention can be adapted for use with a vehicle wash system having an inverted L-shaped wash wand with nozzles disposed thereon that travels around the perimeter of a vehicle. In this regard, unless otherwise indicated in the appended claims, the claims shall apply to any type of vehicle wash system. Further, the word "or" as used in one or more of the appended claims is to be construed inclusively to mean "one or another or both".

We claim:

1. A method of washing a vehicle using an automated vehicle washing system, the vehicle having a rear end, a front end, and a length, the method comprising:
    moving a gantry relative to the vehicle;
    spraying cleaning solution from one or more nozzles of a plurality of nozzles, the plurality of nozzles being attached with the gantry, the plurality of nozzles being fluidly coupled to a source of cleaning solution; and varying the pressure of the cleaning solution sprayed from one or more nozzles of the plurality of nozzles based on one or more positions of the gantry, said gantry having a first position proximate to one of the front end or rear end of the vehicle, a second position proximate the other of the front end or rear end of the vehicle, a third position between said first and second positions, and a fourth position between said first and second positions and different from said third position, and wherein said pressure is varied at said third and fourth positions.

2. The method of claim 1 wherein said third position indicates a transition from one section of the vehicle having a height less than a predetermined vehicle distance to another section of the vehicle having a height equal to or in excess of the predetermined distance.

3. The method of claim 2 wherein the vertical distance is between 40" and 46".

4. The method of claim 2 further including determining a height profile of the vehicle along the length of the vehicle relative to the predetermined vertical distance.

5. The method of claim 1 wherein the fourth position indicates a transition from one section of the vehicle having a height equal to or greater than a predetermined vertical distance to another section of the vehicle having a height less than the predetermined vertical distance.

6. A method for washing a vehicle using an automated vehicle washing system, the vehicle having a rear end, a front end, and a length, the method comprising:

moving a gantry relative to the vehicle;

spraying cleaning solution from one or more nozzles of a plurality of nozzles, the plurality of nozzles being attached with the gantry, the plurality of nozzles being fluidly coupled to a source of cleaning solution; and varying the number of nozzles from which cleaning solution is sprayed based on one or more positions of the gantry, the gantry having a first position proximate to one of the front end or rear end of the vehicle, a second position proximate the other of the front end or rear end of the vehicle, a third position between said first and second positions and a fourth position between said first and second positions and different from said third position, and wherein said nozzles are varied at said third and fourth positions.

7. The method of claim 6 wherein said third position indicates a transition from one section of the vehicle having a height less than a predetermined vehicle distance to another section of the vehicle and having a height equal to or in excess of the predetermined distance.

8. The method of claim 6 wherein the fourth position indicates a transition from one section of the vehicle having a height equal to or greater than a predetermined vertical distance to another section of the vehicle having a height less than the predetermined vertical distance.

9. The method of claim 8 wherein the vertical distance is between 40 inches and 46 inches.

10. The method of claim 8 further including determining a height profile of the vehicle along the length of the vehicle relative to the predetermined vertical distance.

* * * * *

UNITED STATES PATENT AND TRADEMARK OFFICE
CERTIFICATE OF CORRECTION

PATENT NO. : 6,863,739 B2
DATED : March 8, 2005
INVENTOR(S) : Daniel A. Fratello et al.

It is certified that error appears in the above-identified patent and that said Letters Patent is hereby corrected as shown below:

Title page,
Item [56], References Cited, U.S. PATENT DOCUMENTS, insert
-- 5,076,304   12/1991   Mathews...........................134/57R
   5,161,557   11/1992   Scheiter, Jr. .......................134/57R
   5,447,574   09/1995   Inoue...............................134/18
   5,806,542   09/1998   Hoffer et al. .......................134/57R --.

Signed and Sealed this

Twenty-fourth Day of May, 2005

JON W. DUDAS
*Director of the United States Patent and Trademark Office*